(12) United States Patent
Balasubramanian et al.

(10) Patent No.: US 9,119,119 B2
(45) Date of Patent: Aug. 25, 2015

(54) 1×RTT AND HRPD NEIGHBOR LIST SUPPORT OVER LTE

(75) Inventors: Srinivasan Balasubramanian, San Diego, CA (US); Thomas Klingenbrunn, San Diego, CA (US); Shyamal Ramachandran, San Diego, CA (US); Arvind Swaminathan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 870 days.

(21) Appl. No.: 12/582,628

(22) Filed: Oct. 20, 2009

(65) Prior Publication Data

US 2010/0111043 A1    May 6, 2010

Related U.S. Application Data

(60) Provisional application No. 61/110,346, filed on Oct. 31, 2008.

(51) Int. Cl.
| | | |
|---|---|---|
| *H04W 4/00* | (2009.01) | |
| *H04W 36/00* | (2009.01) | |
| *H04W 24/00* | (2009.01) | |
| *H04W 36/14* | (2009.01) | |
| *H04W 74/02* | (2009.01) | |

(52) U.S. Cl.
CPC .......... *H04W 36/0061* (2013.01); *H04W 24/00* (2013.01); *H04W 36/14* (2013.01); *H04W 74/02* (2013.01)

(58) Field of Classification Search
USPC .............. 370/282, 329, 342, 347, 395.4, 412, 370/442, 469; 455/67.11, 67.13, 69, 12.1
See application file for complete search history.

(56) References Cited

U.S. PATENT DOCUMENTS

| 7,489,930 B2 | 2/2009 | Aerrabotu et al. |
| 8,195,204 B1 * | 6/2012 | Shetty et al. .................. 455/458 |
| 2004/0053606 A1 * | 3/2004 | Artamo et al. ............. 455/422.1 |
| 2007/0098147 A1 | 5/2007 | Chaudry et al. |
| 2008/0039082 A1 | 2/2008 | Kim |

(Continued)

FOREIGN PATENT DOCUMENTS

| CN | 1261510 A | 7/2000 |
| JP | 200752478 | 8/2007 |

(Continued)

OTHER PUBLICATIONS

International Search Report & Written Opinion—PCT/US09/062878, International Search Authority—European Patent Office—Mar. 1, 2010.

(Continued)

*Primary Examiner* — Zewdu A Beyen
(74) *Attorney, Agent, or Firm* — Anthony R. Morris

(57) ABSTRACT

Devices and methods are provided for supporting single carrier Radio Transmission Technology (1×RTT) and High Rate Packet Data (HRPD) neighbor lists over LTE, thereby enabling efficient scans for 3GPP2 neighbors with minimal interruption to the LTE operations both when idle or when in-traffic. In one embodiment, the method may involve accessing a neighbor list, each neighboring system in the list being prioritized based at least in part on whether the access terminal (AT) supports a hybrid mode. For example, the method may involve selecting the 3GPP2 system to handin to based at least in part on the neighbor list.

52 Claims, 15 Drawing Sheets

(56) References Cited

U.S. PATENT DOCUMENTS

| | | |
|---|---|---|
| 2008/0117859 A1 | 5/2008 | Shahidi et al. |
| 2008/0259876 A1* | 10/2008 | Qiang et al. ............ 370/332 |
| 2009/0068969 A1* | 3/2009 | Lindoff et al. ............ 455/161.1 |
| 2014/0206355 A1* | 7/2014 | Pani et al. ............ 455/436 |

FOREIGN PATENT DOCUMENTS

| | | |
|---|---|---|
| WO | 02103988 A1 | 12/2002 |
| WO | 2010051505 A1 | 5/2010 |

OTHER PUBLICATIONS

Rapporteur (Samsung): "Miscellaneous corrections and clarifications" 3GPP Draft; R2-085978 CR to 36331-830-VER2, 3rd Generation Partnership Project (3GPP), Mobile Competence Centre ; 650, Route Des Lucioles ; F-06921 Sophia-Antipolis Cedex; France, no. Prague, Czech Republic; Oct. 15, 2008, XP050320678 [retrieved on Oct. 15, 2008]figures 4.2.1-2.

Taiwan Search Report—TW098136938—TIPO—May 13, 2013.
Taiwan Search Report—TW098136938—TIPO—Nov. 2, 2012.

* cited by examiner

1×RTT AND HRPD NEIGHBOR LIST SUPPORT OVER LTE

CLAIM OF PRIORITY UNDER 35 U.S.C. §119

The present Application for Patent claims priority to Provisional Application No. 61/110,346 entitled "1×RTT AND HRPD NEIGHBOR LIST SUPPORT OVER LTE," filed Oct. 31, 2008, and assigned to the assignee hereof and hereby expressly incorporated by reference herein.

BACKGROUND

1. Field

The present application relates generally to wireless communications, and more specifically to methods and systems for handling transitions between different wireless systems, such as, for example, from 3rd Generation Partnership Project (3GPP) Long Term Evolution (LTE) systems to 3rd Generation Partnership Project 2 (3GPP2) systems.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

With the deployment of a multitude of wireless technologies worldwide and support for these technologies in mobile multimode devices or user equipment, there is a growing need for seamless system selection toward the goal of global roaming Furthermore, any particular geographic region may support mixed technologies and networks, such as 3GPP and 3GPP2 technologies.

A mobile multimode device that supports mixed technologies may include multiple databases that are used in selecting optimal networks within a technology. As an example, for 3GPP2 technologies, such as certain CDMA2000 (Code Division Multiple Access 2000) networks, a Preferred Roaming List (PRL) database which is stored at the mobile device provides information about which system/network from 3GPP2 technologies is preferred in a geographic region for that device. Whether predetermined or programmed via over-the-air (OTA) Management protocols, the PRL contains information about the preferred networks and the order in which they should be selected for the user. PRLs for 3GPP2 technologies may be structured to have a table associated with each geographical region, which in turn contains a list of system descriptions keyed by system identifier/network identifier (SID/NID) pairs and associated with an acquisition index. The acquisition index is used as a pointer to an acquisition table AT which contains an indexed list of RF channels for channel acquisition purposes in the related system.

On the other hand, for 3GPP technologies, such as Global System for Mobile (GSM) and UMTS Terrestrial Radio Access (UTRA), a differently structured database list of preferred networks, termed Public Land Mobile Networks (PLMNs), is stored in a Subscriber Identity Module (SIM) or Universal Subscriber Identity Module (USIM) of the mobile device. The PLMNs in the database include a Mobile Network Code (MNC) that is used in combination with a Mobile Country Code (MCC) (also known as a "MCC/MNC tuple") to uniquely identify a service operator using a 3GPP technology, such as GSM and UMTS public land mobile networks.

In addition, a new class of small base stations has emerged, which may be installed in a user's home and provide indoor wireless coverage to mobile units using existing broadband Internet connections. Such a base station is generally known as an Access Point (AP) base station, but may also be referred to as Home Node B (HNB) unit, Home evolved Node B unit (HeNB), femto cell, femto Base Station (fBS), base station, or base station transceiver system. Typically, the AP base station is connected to the Internet and the mobile operator's network via a Digital Subscriber Line (DSL), cable internet access, T1/T3, or the like, and offers typical base station functionality, such as Base Transceiver Station (BTS) technology, radio network controller, and gateway support node services. This allows an Access Terminal (AT), also referred to as a cellular/mobile device or handset, or User Equipment (UE), to connect to the AP base station and utilize the wireless service. ATs can include, for example, cellular phones, smart phones, laptops, handheld communication devices, handheld computing devices, satellite radios, navigational devices, Personal Digital Assistants (PDAs), or any other suitable device for communicating over a wireless communication system.

In a heterogeneous wireless access environment that includes a plurality of radio access technologies, as well as macro base stations and femto base stations, there is a need for ATs that are equipped to handle idle and in-traffic transitions between different networks in a seamless manner. For example, such technologies would make it possible to support Single Carrier Radio Transmission Technology (1×RTT) and High Rate Packet Data (HRPD) neighbor lists over LTE. The embodiments described in detail below enable, for example, efficient scans for 3GPP2 neighbors with minimal interruption to the LTE operations both when idle or when in-traffic.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with a method by which an AT handles an idle transition from a first wireless communication system to a second wireless communication system. For example, the idle transition method may involve accessing a neighbor list, each neighboring system in the list being prioritized based at least in part on whether the AT supports a hybrid mode. The list may comprise at least one of an eHRPD neighbor, a Single Carrier Radio Transmission Technology (1×RTT) neighbor, and a High Rate Data Packet (HRPD) neighbor.

In one embodiment, the method may involve selecting the second system to handin to based at least in part on the neighbor list. The step of selecting the second system may comprise: detecting at least one eHRPD neighbor; in response to the AT not supporting the hybrid mode, comparing relative thresholds of the first system and the at least one eHRPD neighbor against respective first system and eHRPD signal qualities. The step of selecting the second system may further involve transitioning to the at least one eHRPD neighbor when the first system signal quality is lower than a first threshold of the first system and/or the eHRPD signal quality is greater than an eHRPD threshold. For example, the first system may comprise a Long Term Evolution (LTE) system and the second system may comprise a 3rd Generation Partnership Project 2 (3GPP2) system.

In related aspects, the method may involve determining an absence of any detectable eHRPD neighbors. In response to the AT not supporting the hybrid mode, the method may involve remaining on the LTE system. The method may further involve transitioning to one of an available 1×RTT neighbor and an available HRPD neighbor when LTE coverage is no longer available. For example, the method may involve transitioning to the 1×RTT neighbor when the LTE signal quality is lower than an LTE threshold and/or the 1×RTT signal quality is greater than an 1×RTT threshold. Similarly, the method may involve transitioning to the HRPD neighbor when the LTE signal quality is lower than an LTE threshold and/or the HRPD signal quality is greater than an HRPD threshold.

In another embodiment, the method may involve detecting at least one 1×RTT neighbor. In response to the AT supporting the hybrid mode, the method may involve comparing relative thresholds of the first system and the at least one 1×RTT neighbor against respective first system and 1×RTT signal qualities. The method may further involve transitioning to the at least one 1×RTT neighbor when the first system signal quality is lower than a first threshold and/or the 1×RTT signal quality is greater than an 1×RTT threshold.

In related aspects, the method may involve detecting any eHRPD neighbors that are associated with the at least one 1×RTT neighbor. The method may further involve selecting one of the associated eHRPD neighbors based at least in part on the relative thresholds of the associated eHRPD neighbors, and connecting with the selected associated eHRPD neighbor. In further related aspects, the method may involve determining an absence of any detectable 1×RTT neighbors. In response to the AT supporting the hybrid mode, the method may further involve scanning for at least one of an available eHRPD system and an available HRPD system to handin to.

In accordance with one or more embodiments and corresponding disclosure thereof, various aspects are described in connection with a method by which an AT handles an in-traffic transition from a first wireless communication system (e.g., an LTE system) to a second wireless communication system (e.g., a 3GPP2 system). The in-traffic transition method may involve accessing a neighbor list that prioritizes (a) any eHRPD neighbors over any 1×RTT neighbors and (b) the any 1×RTT neighbors over any HRPD neighbors. The method may further involve selecting the second system to handin to based at least in part on the neighbor list.

In one embodiment, the step of selecting the second system may involve scanning for at least one of the eHRPD neighbors. The method may involve detecting the at least one eHRPD neighbor, and comparing relative thresholds of the first system and the at least one eHRPD neighbor against respective first system and eHRPD signal qualities. The method further involve transitioning to the at least one eHRPD neighbor when the first system signal quality is lower than a first threshold of the first system and/or the eHRPD signal quality of the at least one eHRPD neighbor is greater than an eHRPD threshold.

In accordance with one or more embodiments and corresponding disclosure thereof, various aspects are described in connection with devices and apparatuses for handling an idle transition from a first wireless communication system to a second wireless communication system. The apparatus may include: a transceiver module; at least one processor operatively coupled with the transceiver module; and a memory module operatively coupled with the at least one processor and comprising executable code for the at least one processor. The memory module may include executable code for the at least one processor to: (a) access a neighbor list, each neighboring system in the list being prioritized based at least in part on whether the AT supports a hybrid mode; and (b) select the second system to handin to based at least in part on the neighbor list. For example, the list may comprise at least one of an eHRPD neighbor, an 1×RTT neighbor, and an HRPD neighbor.

In one embodiment, the at least one processor may detect at least one eHRPD neighbor. In response to the AT not supporting the hybrid mode, the at least one processor may compare relative thresholds of the first system and the at least one eHRPD neighbor against respective first system and eHRPD signal qualities. The at least one processor may instruct the AT to transition to the at least one eHRPD neighbor when the first system signal quality is lower than an first threshold of the first system and/or the eHRPD signal quality is greater than an eHRPD threshold.

In related aspects, the at least one processor may determine an absence of any detectable eHRPD neighbors. In response to the AT not supporting the hybrid mode, the at least one processor may instruct the AT to remain on the LTE system. The at least one processor may instruct the AT to transition to one of an available 1×RTT neighbor and an available HRPD neighbor when LTE coverage is no longer available.

In accordance with one or more embodiments and corresponding disclosure thereof, various aspects are described in connection with devices and apparatuses for handling an in-traffic transition from a first wireless communication system to a second wireless communication system. The apparatus may include: a transceiver module; at least one processor operatively coupled with the transceiver module; and a memory module operatively coupled with the at least one processor and comprising executable code for the at least one processor. The memory module may include executable code for the at least one processor to: (a) access a neighbor list that prioritizes (i) any eHRPD neighbors over any 1×RTT neighbors and (ii) the any 1×RTT neighbors over any HRPD neighbors; and (b) select the second system to handin to based at least in part on the neighbor list.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
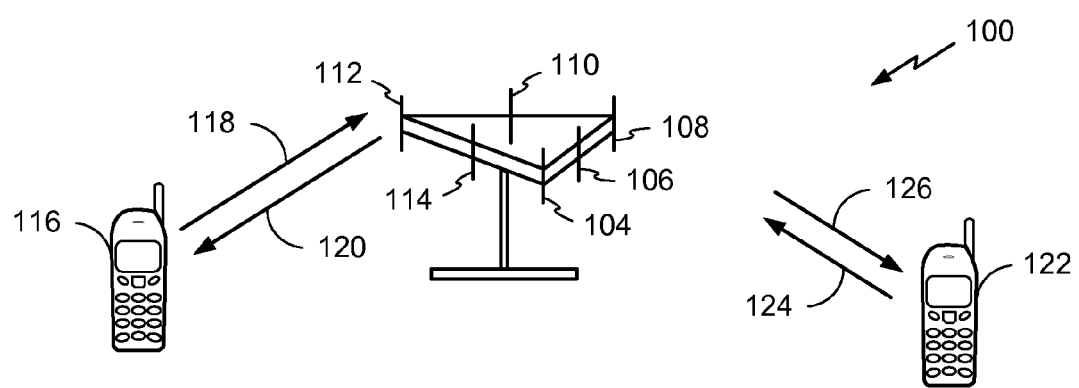
FIG. 1 illustrates a multiple access wireless communication system according to one embodiment.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP ). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

SC-FDMA systems utilize single carrier modulation and frequency domain equalization, and may have similar performance and essentially the same overall complexity as those of OFDMA systems. A SC-FDMA signal generally has lower Peak-to-Average Power Ratio (PAPR) because of its inherent single carrier structure. SC-FDMA has drawn great attention, especially for uplink communications where lower PAPR greatly benefits the mobile terminal in terms of transmit power efficiency, and is currently a working assumption for uplink multiple access schemes in 3GPP LTE or Evolved UTRA. For the purposes of the present document, the following abbreviations apply:

AM Acknowledged Mode
AMD Acknowledged Mode Data
ARQ Automatic Repeat Request
BCCH Broadcast Control Channel
BCH Broadcast Channel
CCCH Common Control Channel
CCH Control Channel
CCTrCH Coded Composite Transport Channel
CP Cyclic Prefix
CRC Cyclic Redundancy Check
CTCH Common Traffic Channel
DCCH Dedicated Control Channel
DCH Dedicated Channel
DL Downlink
DL-SCH Downlink Shared Channel
DSCH Downlink Shared Channel
DTCH Dedicated Traffic Channel
FACH Forward link Access Channel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multimedia Broadcast Multicast Service
MBSFN Multicast Broadcast Single Frequency Network
MCE MBMS Coordinating Entity
MCH Multicast Channel
MRW Move Receiving Window
MSB Most Significant Bit
MSCH MBMS point-to-multipoint Scheduling Channel
MTCH MBMS point-to-multipoint Traffic Channel
PCCH Paging Control Channel
PCH Paging Channel
PDCCH Physical Downlink Control Channel
PDSCH Physical Downlink Shared Channel
PDU Protocol Data Unit
PHY Physical layer
PhyCH Physical Channel
RACH Random Access Channel
RLC Radio Link Control
RRC Radio Resource Control
SAP Service Access Point
SDU Service Data Unit
SHCCH Shared channel Control Channel
SN Sequence Number
SUFI Super Field
TCH Traffic Channel
TDD Time Division Duplex
TFI Transport Format Indicator
TM Transparent Mode
TMD Transparent Mode Data
TTI Transmission Time Interval
UE User Equipment
UL Uplink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In an FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the AP. In the embodiment, antenna groups each are designed to communicate to access terminals in a sector of the areas covered by AP 100. In communication over forward links 120 and 126, the transmitting antennas of AP 100 utilize beam-forming in order to improve the signal-to-noise ratio of forward links for the different access terminals 116 and 124. Also, an AP using beamforming to transmit to access terminals scattered randomly through its coverage causes less interference to access terminals in neighboring cells than an AP transmitting through a single antenna to all its access terminals.

In accordance with aspects of the embodiments described herein, there is provided a multiple-in-multiple-out (MIMO) system that employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \le \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 2:
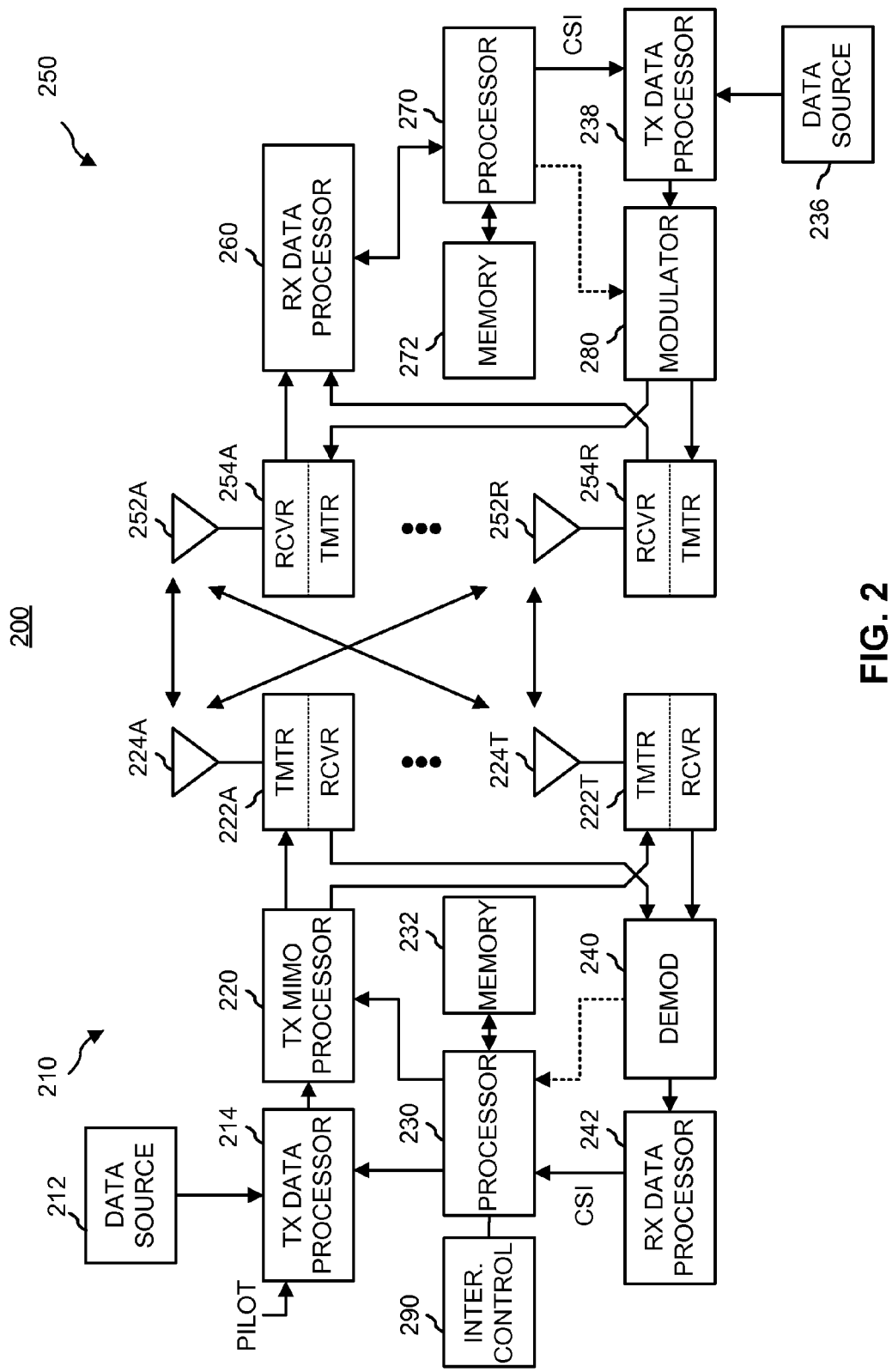
FIG. 2 illustrates a block diagram of a communication system.

The teachings herein may be incorporated into a node (e.g., a device) employing various components for communicating with at least one other node. FIG. 2 depicts several sample components that may be employed to facilitate communication between nodes. Specifically, FIG. 2 illustrates a wireless device 210 (e.g., an access point) and a wireless device 250 (e.g., an access terminal) of a MIMO system 200. At the device 210, traffic data for a number of data streams is provided from a data source 212 to a transmit ("TX") data processor 214.

In some aspects, each data stream is transmitted over a respective transmit antenna. The TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., Binary Phase Shift Keying (BPSK), Quadrature Phase-Shift Keying (QPSK), M-ary Phase Shift Keying (M-PSK), or Multi-Level Quadrature Amplitude Modulation (M-QAM)) selected for that data stream to provide modulation symbols. The data rate, coding, and modulation for each data stream may be determined by instructions performed by a processor 230. A data memory 232 may store program code, data, and other information used by the processor 230 or other components of the device 210.

The modulation symbols for all data streams are then provided to a TX MIMO processor 220, which may further process the modulation symbols (e.g., for OFDM). The TX MIMO processor 220 then provides $N_T$ modulation symbol streams to $N_T$ transceivers ("XCVR") 222A through 222T. In some aspects, the TX MIMO processor 220 applies beam-forming weights to the symbols of the data streams and to the antenna from which the symbol is being transmitted.

Each transceiver 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 222A through 222T are then transmitted from $N_T$ antennas 224A through 224T, respectively.

At the device 250, the transmitted modulated signals are received by NR antennas 252A through 252R and the received signal from each antenna 252 is provided to a respective transceiver ("XCVR") 254A through 254R. Each transceiver 254 conditions (e.g., filters, amplifies, and downconverts) a respective received signal, digitizes the conditioned signal to provide samples, and further processes the samples to provide a corresponding "received" symbol stream.

A receive ("RX") data processor 260 then receives and processes the NR received symbol streams from NR transceivers 254 based on a particular receiver processing technique to provide $N_T$ "detected" symbol streams. The RX data processor 260 then demodulates, deinterleaves, and decodes each detected symbol stream to recover the traffic data for the data stream. The processing by the RX data processor 260 is complementary to that performed by the TX MIMO processor 220 and the TX data processor 214 at the device 210.

A processor 270 periodically determines which pre-coding matrix to use (discussed below). The processor 270 formulates a reverse link message comprising a matrix index portion and a rank value portion. A data memory 272 may store program code, data, and other information used by the processor 270 or other components of the device 250.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by the transceivers 254A through 254R, and transmitted back to the device 210.

At the device 210, the modulated signals from the device 250 are received by the antennas 224, conditioned by the transceivers 222, demodulated by a demodulator ("DEMOD") 240, and processed by a RX data processor 242 to extract the reverse link message transmitted by the device 250. The processor 230 then determines which pre-coding matrix to use for determining the beam-forming weights then processes the extracted message. It should be appreciated that for each device 210 and 250 the functionality of two or more of the described components may be provided by a single component.

In accordance with one aspect of the embodiments described herein, logical channels may be classified into Logical Control Channels and Logical Traffic Channels. The Logical Control Channels may comprise: a BCCH which is a DL channel for broadcasting system control information; a PCCH which is a DL channel that transfers paging information; and/or a MBMS point-to-multipoint Control Channel which is a point-to-multipoint DL channel used for transmitting MBMS scheduling and control information for one or several MTCHs. Generally, after establishing an RRC connection this channel is used by ATs that receive MBMS. In the alternative, or in addition, the Logical Control Channels may comprise DCCH which is a point-to-point bi-directional channel that transmits dedicated control information, and may be used by ATs having an RRC connection. In accordance with another aspect of the embodiments described herein, the Logical Traffic Channels may comprise: a DTCH which is a point-to-point bi-directional channel, dedicated to one AT for the transfer of user information; and/or a MTCH which is a point-to-multipoint DL channel for transmitting traffic data.

In accordance with one aspect, Transport Channels may be classified into DL and UL. The DL Transport Channels may comprise: a BCH, a Downlink Shared Data Channel (DL-SDCH) and a PCH, the PCH for support of AT power saving (DRX cycle is indicated by the network to the AT), broadcasted over entire cell and mapped to PHY resources which can be used for other control/traffic channels. The UL Transport Channels may comprise a RACH, a Request Channel (REQCH), an Uplink Shared Data Channel (UL-SDCH), and/or a plurality of PHY channels. The PHY channels may comprise a set of DL channels and UL channels.

The DL PHY channels may comprise: a Common Pilot Channel (CPICH); Synchronization Channel (SCH); a CCCH; a Shared DL Control Channel (SDCCH); a Multicast Control Channel; a Shared UL Assignment Channel (SUACH); an Acknowledgement Channel (ACKCH); a DL Physical Shared Data Channel (DL-PSDCH); an UL Power Control Channel (UPCCH); a Paging Indicator Channel (PICH); and/or a Load Indicator Channel (LICH).

The UL PHY channels may comprise: a Physical Random Access Channel (PRACH); a Channel Quality Indicator Channel (CQICH); an ACKCH; an Antenna Subset Indicator Channel (ASICH); a Shared Request Channel (SREQCH); an UL Physical Shared Data Channel (UL-PSDCH); and/or a Broadband Pilot Channel (BPICH).

In related aspects, a channel structure is provided that preserves low Peak-to-Average Power Ratio (PAR) (at any given time, the channel is contiguous or uniformly spaced in frequency) properties of a single carrier waveform.

In some aspects, the teachings herein may be employed in a network that includes macro scale coverage (e.g., a large area cellular network such as a 3G networks, typically referred to as a macro cell network) and smaller scale coverage (e.g., a residence-based or building-based network environment). As an AT moves through such a network, the AT may be served in certain locations by access nodes (ANs) that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, evolved Node B (eNodeB), macro cell, and so on. Also, a femto node may be configured or referred to as a Home Node B (HNB), Home evolved Node B (eNodeB), AP base station, femto cell, and so on.

Figure 3A:
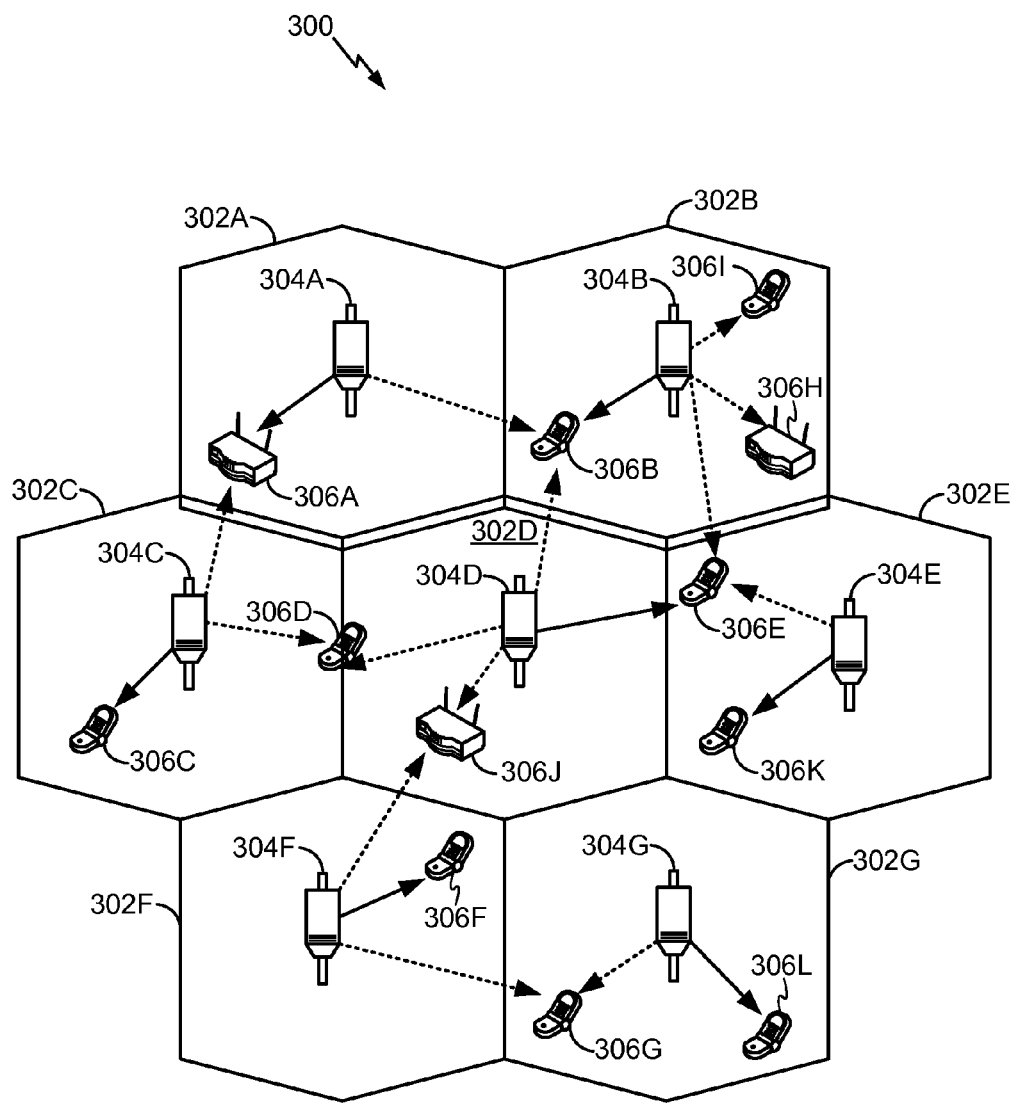
FIGS. 3A-C illustrate aspects of deployment of access point base stations within a network environment.

FIG. 3A illustrates a wireless communication system 300, configured to support a number of users, in which the teachings herein may be implemented. The system 300 provides communication for multiple cells 302, such as, for example, macro cells 302A-302G, with each cell being serviced by a corresponding access node 304 (e.g., access nodes 304A-304G). As shown in FIG. 3, access terminals 306 (e.g., access terminals 306A-306L) may be dispersed at various locations throughout the system over time. Each access terminal 306 may communicate with one or more access nodes 304 on a forward link and/or a reverse link at a given moment, depending upon whether the access terminal 306 is active and whether it is in soft handoff, for example. The wireless communication system 300 may provide service over a large geographic region. For example, macro cells 302A-302G may cover a few blocks in a neighborhood.

Figure 3B:
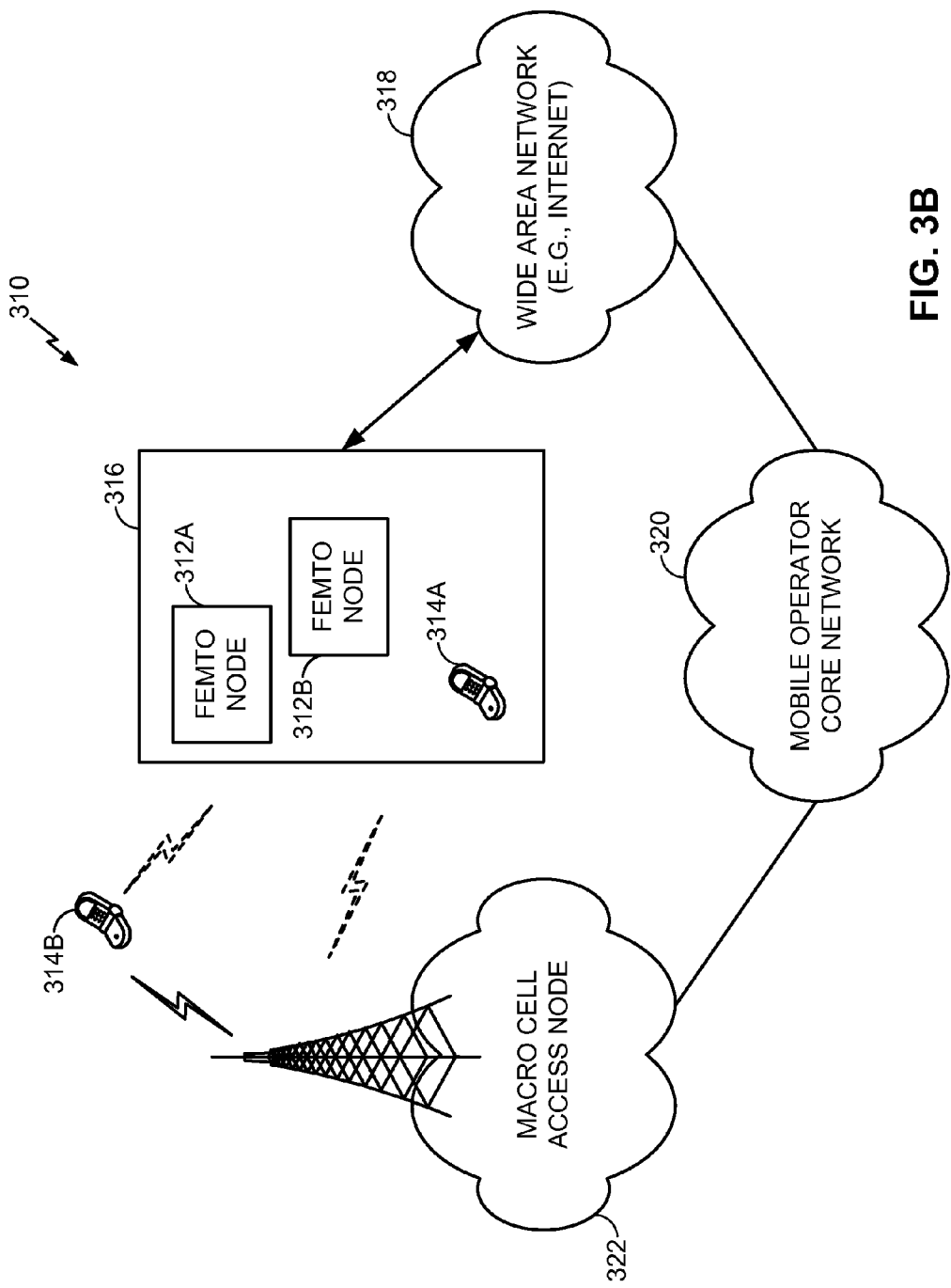

FIG. 3B illustrates an exemplary communication system 310 where one or more femto nodes are deployed within a network environment. Specifically, the system 310 includes multiple femto nodes 312 (e.g., femto nodes 312A and 312B) installed in a relatively small scale network environment (e.g., in one or more user residences 316). Each femto node 312 may be coupled to a wide area network 318 (e.g., the Internet) and a mobile operator core network 320 via a DSL router, a cable modem, a wireless link, or other connectivity means (not shown). As will be discussed below, each femto node 312 may be configured to serve associated access terminals 314 (e.g., access terminal 314A) and, optionally, alien access terminals 314 (e.g., access terminal 314B). In other words, access to femto nodes 312 may be restricted whereby a given access terminal 314 may be served by a set of designated (e.g., home) femto node(s) 312 but may not be served by any non-designated femto nodes 312 (e.g., a neighbor's femto node 312).

Figure 3C:
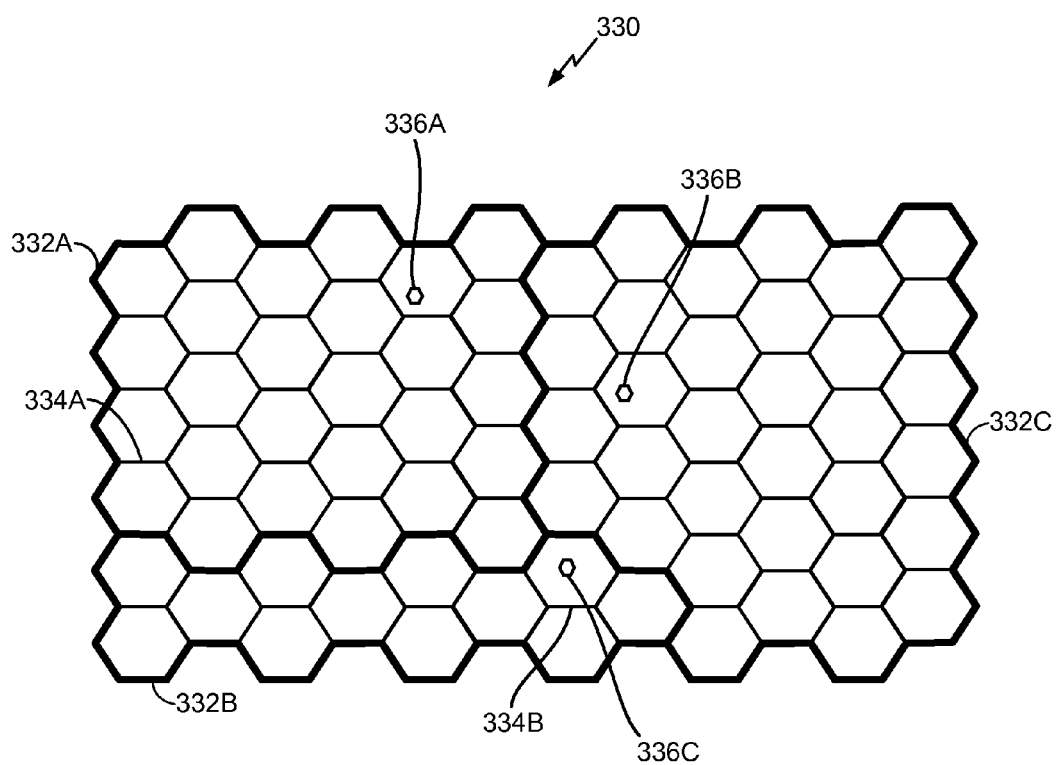

FIG. 3C illustrates an example of a coverage map 330 where several tracking areas 332 (or routing areas or location areas) are defined, each of which includes several macro coverage areas 334. Here, areas of coverage associated with tracking areas 332A, 332B, and 332C are delineated by the wide lines and the macro coverage areas 334 are represented by the hexagons. The tracking areas 332 also include femto coverage areas 336. In this example, each of the femto coverage areas 336 (e.g., femto coverage area 336C) is depicted within a macro coverage area 334 (e.g., macro coverage area 334B). It should be appreciated, however, that a femto coverage area 336 may not lie entirely within a macro coverage area 334. In practice, a large number of femto coverage areas 336 may be defined with a given tracking area 332 or macro coverage area 334. Also, one or more pico coverage areas (not shown) may be defined within a given tracking area 332 or macro coverage area 334.

Referring again to FIG. 3B, the owner of a femto node 312 may subscribe to mobile service, such as, for example, 3G mobile service, offered through the mobile operator core network 320. In addition, an access terminal 314 may be capable of operating both in macro environments and in smaller scale (e.g., residential) network environments. In other words, depending on the current location of the access terminal 314, the access terminal 314 may be served by an access node 322 of the macro cell mobile network 320 or by any one of a set of femto nodes 312 (e.g., the femto nodes 312A and 312B that reside within a corresponding user residence 316). For example, when a subscriber is outside his home, he is served by a standard macro access node (e.g., node 322) and when the subscriber is at home, he is served by a femto node (e.g., node 312A). Here, it should be appreciated that a femto node 314 may be backward compatible with existing access terminals 314.

A femto node 312 may be deployed on a single frequency or, in the alternative, on multiple frequencies. Depending on the particular configuration, the single frequency or one or more of the multiple frequencies may overlap with one or more frequencies used by a macro node (e.g., node 322).

In some aspects, an access terminal 314 may be configured to connect to a preferred femto node (e.g., the home femto node of the access terminal 314) whenever such connectivity is possible. For example, whenever the access terminal 314 is within the user's residence 316, it may be desired that the access terminal 314 communicate only with the home femto node 312.

In some aspects, if the access terminal 314 operates within the macro cellular network 320 but is not residing on its most preferred network (e.g., as defined in a preferred roaming list), the access terminal 314 may continue to search for the most preferred network (e.g., the preferred femto node 312) using a Better System Reselection ("BSR"), which may involve a periodic scanning of available systems to determine whether better systems are currently available, and subsequent efforts to associate with such preferred systems. With the acquisition entry, the access terminal 314 may limit the search for specific band and channel. For example, the search for the most preferred system may be repeated periodically. Upon discovery of a preferred femto node 312, the access terminal 314 selects the femto node 312 for camping within its coverage area.

A femto node may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 312 that reside within the corresponding user residence 316). In some implementations, a node may be restricted to not provide, for at least one node, at least one of: signaling, data access, registration, paging, or service.

In some aspects, a restricted femto node (which may also be referred to as a Closed Subscriber Group Home NodeB) is one that provides service to a restricted provisioned set of access terminals. This set may be temporarily or permanently extended as necessary. In some aspects, a Closed Subscriber Group ("CSG") may be defined as the set of access nodes (e.g., femto nodes) that share a common access control list of access terminals. A channel on which all femto nodes (or all restricted femto nodes) in a region operate may be referred to as a femto channel.

Various relationships may thus exist between a given femto node and a given access terminal For example, from the perspective of an access terminal, an open femto node may refer to a femto node with no restricted association. A restricted femto node may refer to a femto node that is restricted in some manner (e.g., restricted for association and/or registration). A home femto node may refer to a femto node on which the access terminal is authorized to access and operate on. A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that authorized to access the restricted femto node. A guest access terminal may refer to an access terminal with temporary access to the restricted femto node. An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionality in the context of a femto node. It should be appreciated, however, that a pico node may provide the same or similar functionality for a larger coverage area. For example, a pico node may be restricted, a home pico node may be defined for a given access terminal, and so on.

In accordance with aspects of the particular subject of this disclosure, there are provided methods, apparatuses and a framework to support single carrier Radio Transmission Technology (1×RTT) and High Rate Packet Data (HRPD) neighbor lists over LTE, and thereby enable efficient scans for 3GPP2 neighbors when idle or when in-traffic.

The current system selection procedure of 1×RTT and HRPD may work in the following manner. The mobile station or AT may look for 1× and HRPD systems based on the sequence of channels listed in the acquisition table of the PRL, subject to the entries in a Most Recently Used (MRU) table, and optionally any associated geographical region indicators (GEOs). When the AT finds an HRPD system first, it may continue looking for an available 1× system for a defined time period (e.g., 30 seconds). If the AT finds a 1× system, and it is the most preferred 1× system the AT can find in that location, the AT may associate with the 1× system. Subsequently, the AT may look for the HRPD systems that are associated with the 1× system that it found and registered on. If the AT does not find a 1× system within the defined time period, the AT may camp on the found HRPD system.

Given this, if the AT is transitioning from LTE to HRPD, the AT needs to first find a valid 1× system and then find the HRPD system it is associated with. Thus, it would be advantageous to figure out how are the 1×RTT, HRPD, and eHRPD neighbors going to be populated over LTE and how is this provided neighbor list going to be handled by the AT. In addition, it would be advantageous to provide the transitions required to be defined. In-traffic transitions from LTE to eHRPD are preferred over transitions from LTE to 1×RTT (which require a Voice Call Continuity (VCC) procedure to retain continuity). The transitions from LTE to 1×RTT mode are preferred over transitions from LTE to HRPD since no service continuity can be guaranteed.

With regard to the preferred listing of 3GPP2 neighbors over LTE, in one embodiment, the preferred order of population of 1×RTT/HRPD/eHRPD neighbors is: (1) eHRPD, (2)

1×RTT, and (3) HRPD. The embodiments described herein will primarily be with respect to the aforementioned preferred order. It is noted, however, that the preferred order may be (1) 1×RTT, (2) eHRPD, and (3) HRPD, in another embodiment.

In accordance with aspects of the embodiments described herein, with respect to idle transitions from an LTE system to a 3GPP2 system, there is provided an exemplary approach wherein transitions from LTE to eHRPD are preferred over transitions from HRPD to 1×RTT. The AT preferably uses the neighbors listed in this preference order to select the system to handoff to when running out of LTE coverage.

In related aspects, when the AT does not support 1×RTT and (e) HRPD hybrid mode, in one embodiment, the threshold to move to eHRPD will generally be higher than what will be used for 1×RTT and HRPD, since the transition will be seamless from the application perspective. The AT will attempt to remain on LTE as long as possible if the only neighbors it is able to find are 1×RTT and HRPD neighbors.

In further related aspects, when the AT supports simultaneous 1×RTT and eHRPD hybrid mode, in one embodiment, the AT first looks for 1×RTT neighbors and then finds the eHRPD systems based on the associated eHRPD systems as listed in the PRL. When the AT is not able to find a 1×RTT system, the AT also scans for available eHRPD and HRPD neighbors to handin to. When the AT is able to find a 1×RTT system to compare relative thresholds against respective LTE and 1×RTT signal qualities, the UE does not perform the scans for eHRPD and HRPD neighbors. This will allow for optimal scans for 3GPP2 systems when camped on LTE.

In accordance with aspects of the embodiments described herein, with respect to in-traffic transitions from an LTE system to a 3GPP2 system, there is provided an approach exemplary wherein, when transitioning in traffic from LTE, measurement reports are needed only for the eHRPD pilots since the call continuity can only be maintained between LTE and eHRPD in the Internet Protocol (IP) domain.

The measurement reports will be useful for 1×RTT systems also in-traffic when the VCC feature is supported in the AT and network. In one embodiment, the AT will first look for eHRPD neighbors prior to looking for 1×RTT neighbors. When the AT is able to find an eHRPD neighbor to compare relative thresholds against signal qualities with the currently operating LTE system, the AT does not scan for 1×RTT or HRPD neighbors. In one embodiment, the AT will not scan for HRPD neighbors when operating in traffic over LTE. In one embodiment, when a given 1× system is associated with both eHRPD and HRPD systems, the assumption is that the eHRPD systems are listed as more preferred for ATs that are eHRPD capable. For ATs that are not eHRPD capable, the AT will list the HRPD channels as being more preferred as the network will prefer to keep the HRPD only devices on the HRPD network and use the eHRPD network in the legacy mode only when there is no HRPD coverage available.

In accordance with aspects of the embodiments described herein, there is provided an exemplary approach that may involve listing only 1× neighbors and then finding associated Data Optimized (DO) system(s) instead of looking for the DO systems(s) first. For example, the sequence may comprise an idle handover to 1× and/or traffic handover to eHRPD. The sequence may include detecting associated system(s) while the AT is on LTE.

In related aspects, there is provided an exemplary approach that may involve listing only eHRPD neighbors (i.e., not listing HRPD neighbors), along with 1× neighbors, and thereby avoiding scanning for HRPD neighbors for handovers of voice calls. In the alternative, the approach may involve listing all three types of neighbors (i.e., eHRPD, 1×, and HRPD) along with priority information regarding the three types of neighbors. Accordingly, the AT may perform scans based on its ability to distinguish between eHRPD, 1×, and HRPD neighbors, resulting in optimal scans when the AT is idle or in-traffic.

Figure 4A:
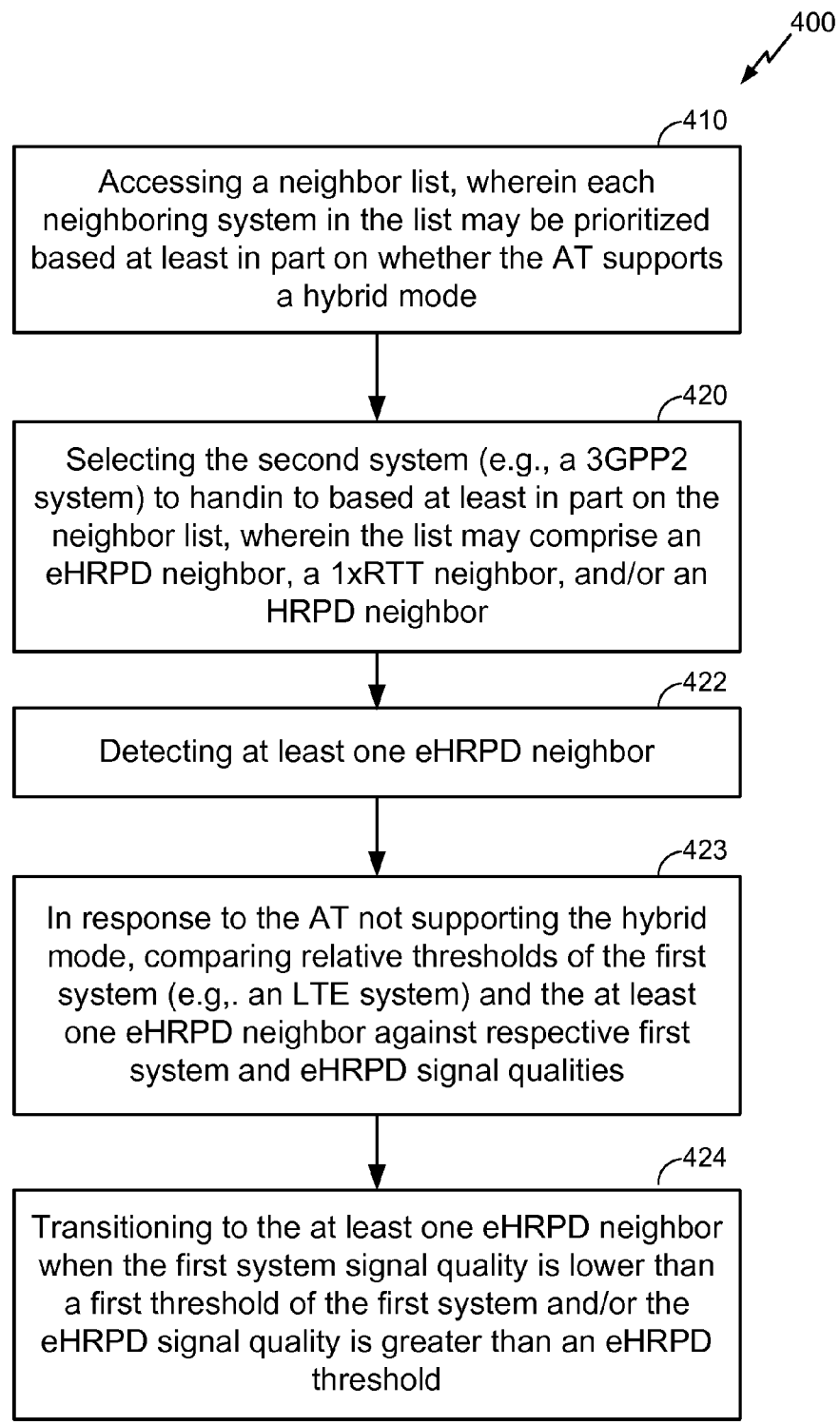
FIG. 4A shows one embodiment for a method for handling an idle transition from a first wireless communication system to a second wireless communication system.

In accordance with one or more aspects of the embodiments described herein, there are provided methods for handling an idle transition from a first wireless communication system to a second wireless communication system. With reference to the flow diagram shown in FIG. 4A, there is provided a method 400 that may be performed at an AT or components thereof. The method 400 may involve, at step 410, accessing a neighbor list, wherein each neighboring system in the list may be prioritized based at least in part on whether the AT supports a hybrid mode. The method 400 may involve, at step 420, selecting the second wireless communication system (e.g., a 3GPP2 system) to handin to based at least in part on the neighbor list. For example, the list may comprise one or more eHRPD neighbors, one or more 1×RTT neighbors, and/or one or more HRPD neighbors.

Step 420 may involve detecting at least one eHRPD neighbor (step 422). In response to the AT not supporting the hybrid mode, step 420 may involve comparing relative thresholds of the first system (e.g., an LTE system) and the at least one eHRPD neighbor against respective first system and eHRPD signal qualities (step 423). Step 420 may further involve transitioning to the at least one eHRPD neighbor when the first system signal quality is lower than a first threshold of the first system and/or the eHRPD signal quality is greater than an eHRPD threshold (step 424).

Figure 4B:
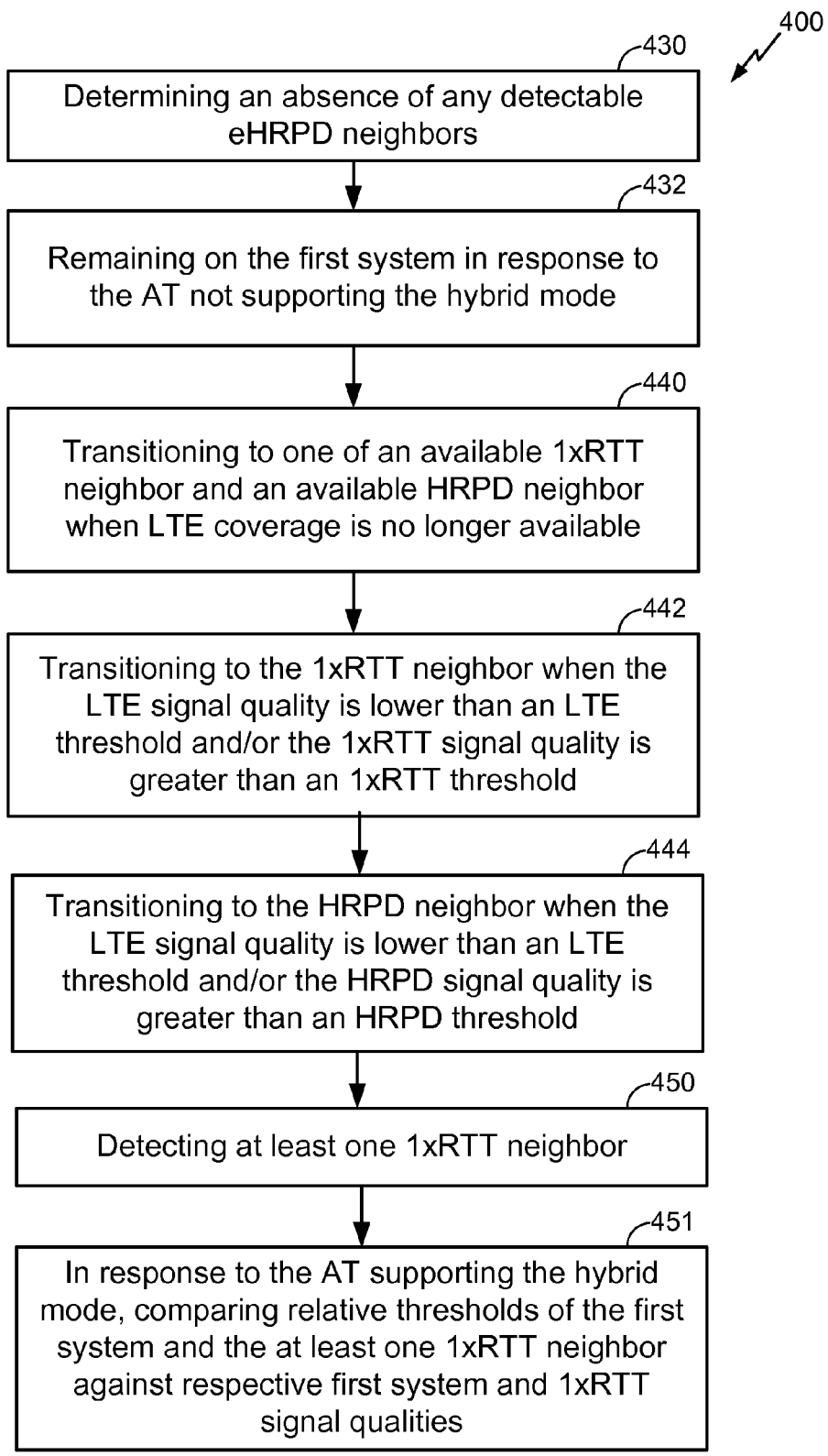
FIGS. 4B-C show sample aspects of the method shown in FIG. 4A.

In related aspects, with reference to FIG. 4B, the method 400 may involve determining an absence of any detectable eHRPD neighbors (step 430), and remaining on the first system in response to the AT not supporting the hybrid mode (step 432). The method 400 may involve, at step 440, transitioning to one of an available 1×RTT neighbor and an available HRPD neighbor when LTE coverage is no longer available. Step 440 may comprise transitioning to the 1×RTT neighbor when the LTE signal quality is lower than an LTE threshold and/or the 1×RTT signal quality is greater than an 1×RTT threshold (step 442), and/or transitioning to the HRPD neighbor when the LTE signal quality is lower than an LTE threshold and/or the HRPD signal quality is greater than an HRPD threshold (step 444).

In further related aspects, the method 400 may involve detecting at least one 1×RTT neighbor (step 450). In response to the AT supporting the hybrid mode, the method 400 may involve comparing relative thresholds of the first system and the at least one 1×RTT neighbor against respective first system and 1×RTT signal qualities (step 451). The method may further involve transitioning to the at least one 1×RTT neighbor when the first system signal quality is lower than a first threshold and/or the 1×RTT signal quality is greater than an 1×RTT threshold (step 452), as shown in FIG. 4C.

Figure 4C:
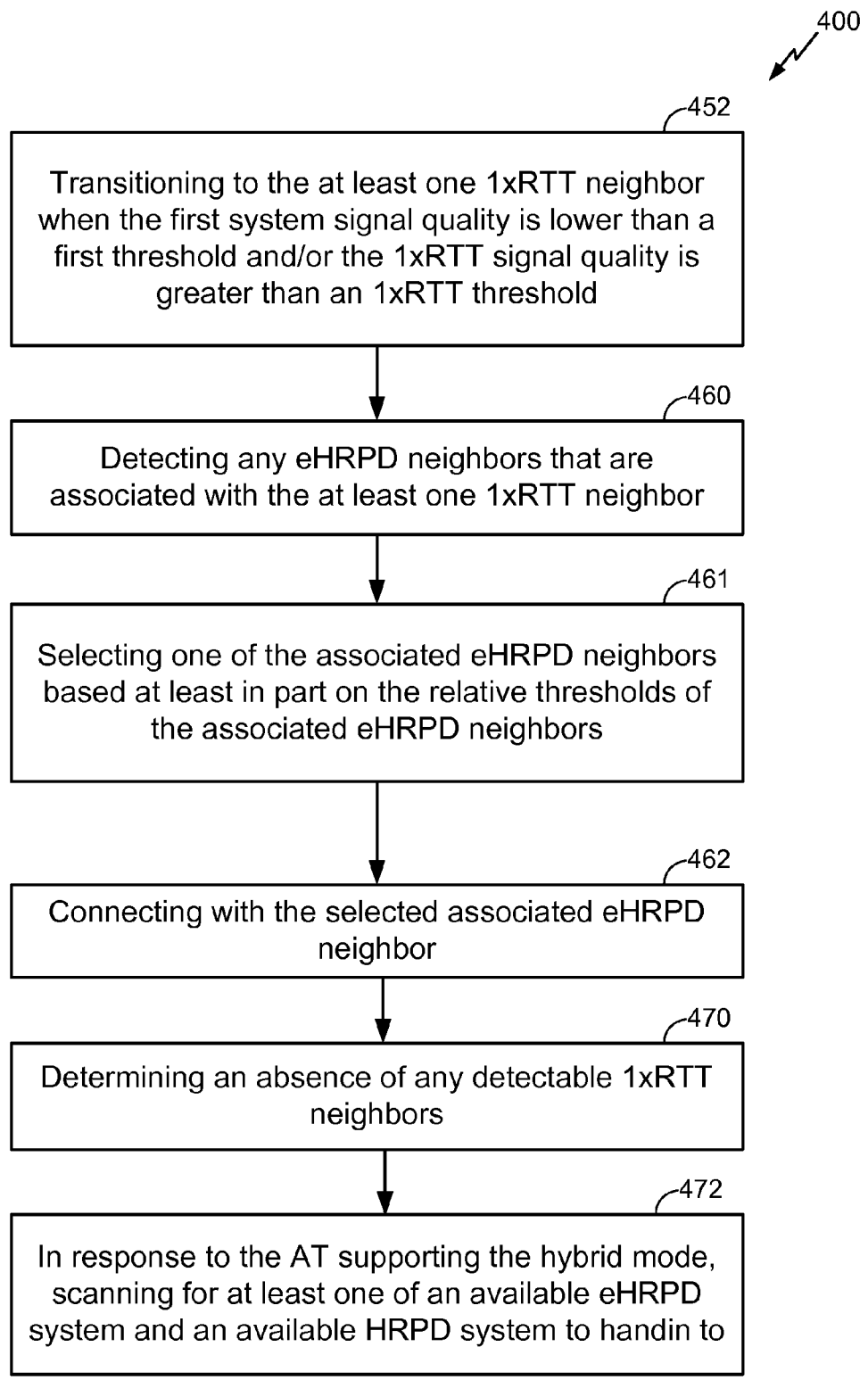

With continued reference to FIG. 4C, the method 400 may also involve detecting any eHRPD neighbors that are associated with the at least one 1×RTT neighbor (step 460), selecting one of the associated eHRPD neighbors based at least in part on the relative thresholds of the associated eHRPD neighbors (step 461), and connecting with the selected associated eHRPD neighbor (step 462).

The method 400 may involve, at step 470, determining an absence of any detectable 1×RTT neighbors. In response to the AT supporting the hybrid mode, the method 400 may further involve scanning for at least one of an available eHRPD system and an available HRPD system to handin to (step 472).

Figure 5A:
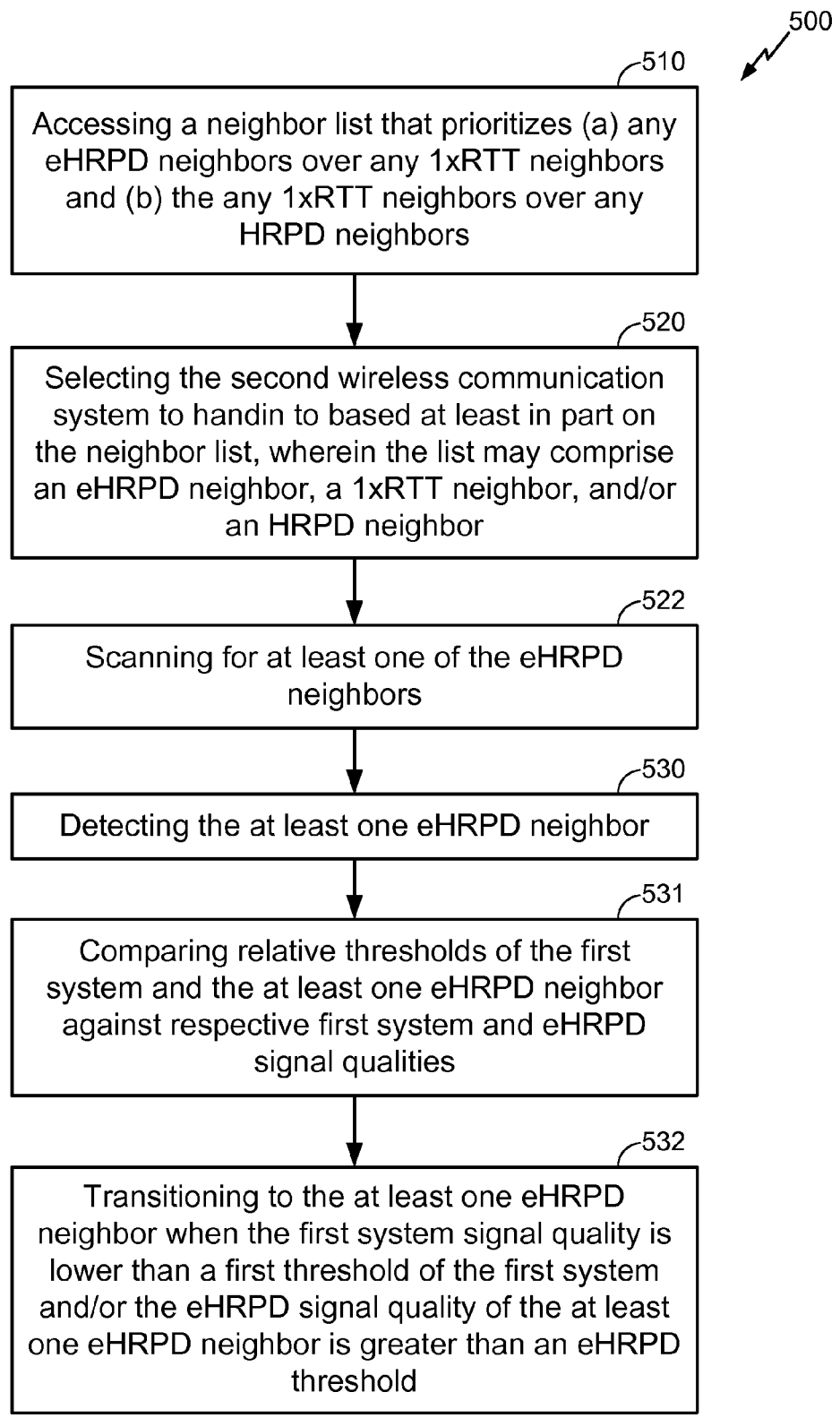
FIG. 5A shows one embodiment for a method for handling an in-traffic transition.

In accordance with one or more aspects of the embodiments described herein, there are provided methods for handling an in-traffic transition from a first wireless communication system to a second wireless communication system. With reference to the flow diagram shown in FIG. 5A, there is provided a method 500 that may be performed at an AT or components thereof. The method 500 may involve, at step 510, accessing a neighbor list that prioritizes (a) any eHRPD neighbors over any 1×RTT neighbors and (b) the any 1×RTT neighbors over any HRPD neighbors. The method 500 may involve, at step 520, selecting the second wireless communication system to handin to based at least in part on the neighbor list. For example, step 520 may comprise scanning for at least one of the eHRPD neighbors (step 522).

The method 500 may involve detecting the at least one eHRPD neighbor (step 530), comparing relative thresholds of the first system and the at least one eHRPD neighbor against respective first system and eHRPD signal qualities (step 531), and transitioning to the at least one eHRPD neighbor when the first system signal quality is lower than a first threshold of the first system and/or the eHRPD signal quality of the at least one eHRPD neighbor is greater than an eHRPD threshold (step 532).

Figure 5B:
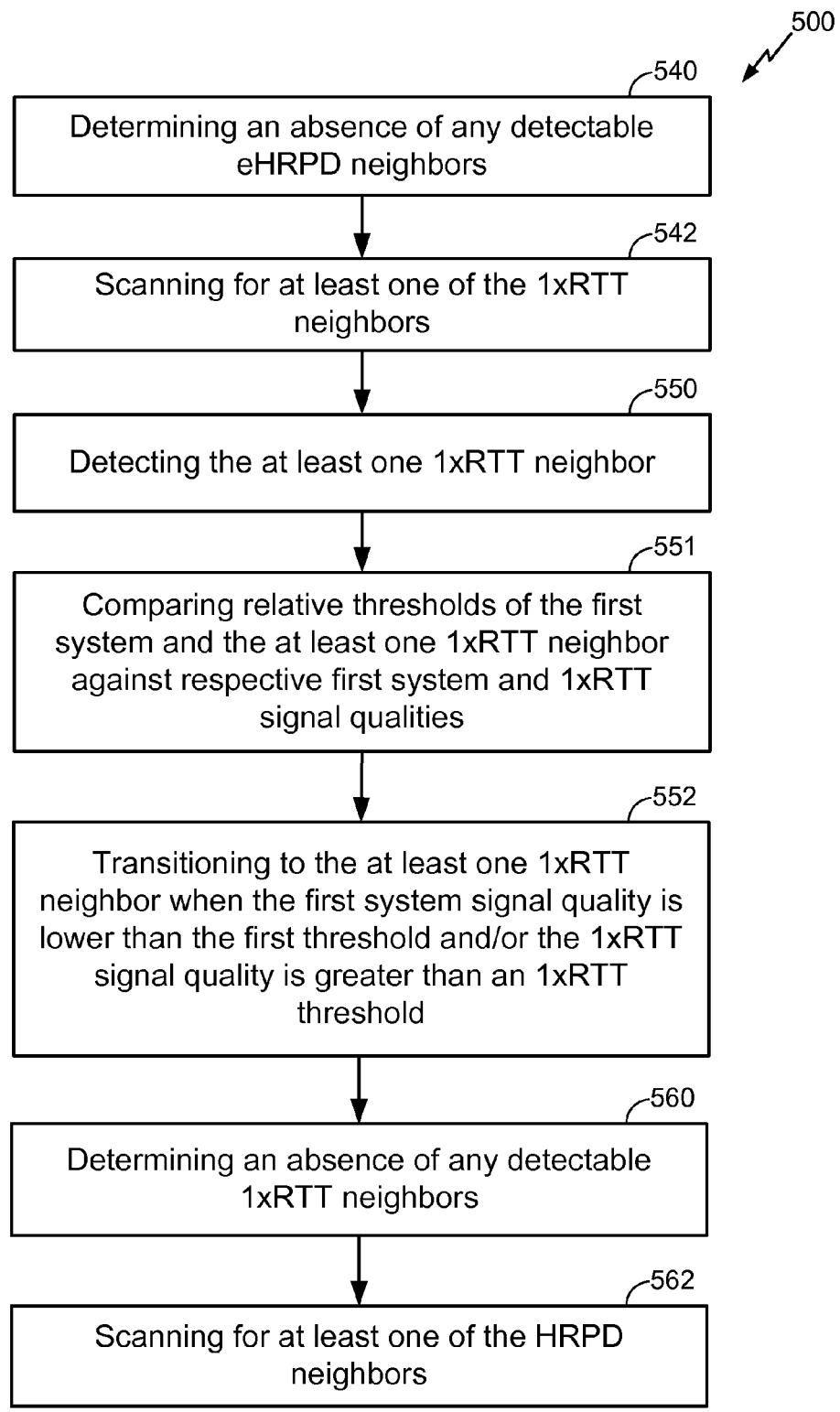
FIG. 5B shows sample aspects of the method shown in FIG. 5A.

In related aspects, with reference to FIG. 5B, the method 500 may involve determining an absence of any detectable eHRPD neighbors (step 540), and scanning for at least one of the 1×RTT neighbors (step 542). The method 500 may involve detecting the at least one 1×RTT neighbor (step 550), comparing relative thresholds of the first system and the at least one 1×RTT neighbor against respective first system and 1×RTT signal qualities (step 551), and transitioning to the at least one 1×RTT neighbor when the first system signal quality is lower than the first threshold and/or the 1×RTT signal quality is greater than an 1×RTT threshold (step 552). The method 500 may involve determining an absence of any detectable 1×RTT neighbors (step 560), and scanning for at least one of the HRPD neighbors (step 562).

Figure 6A:
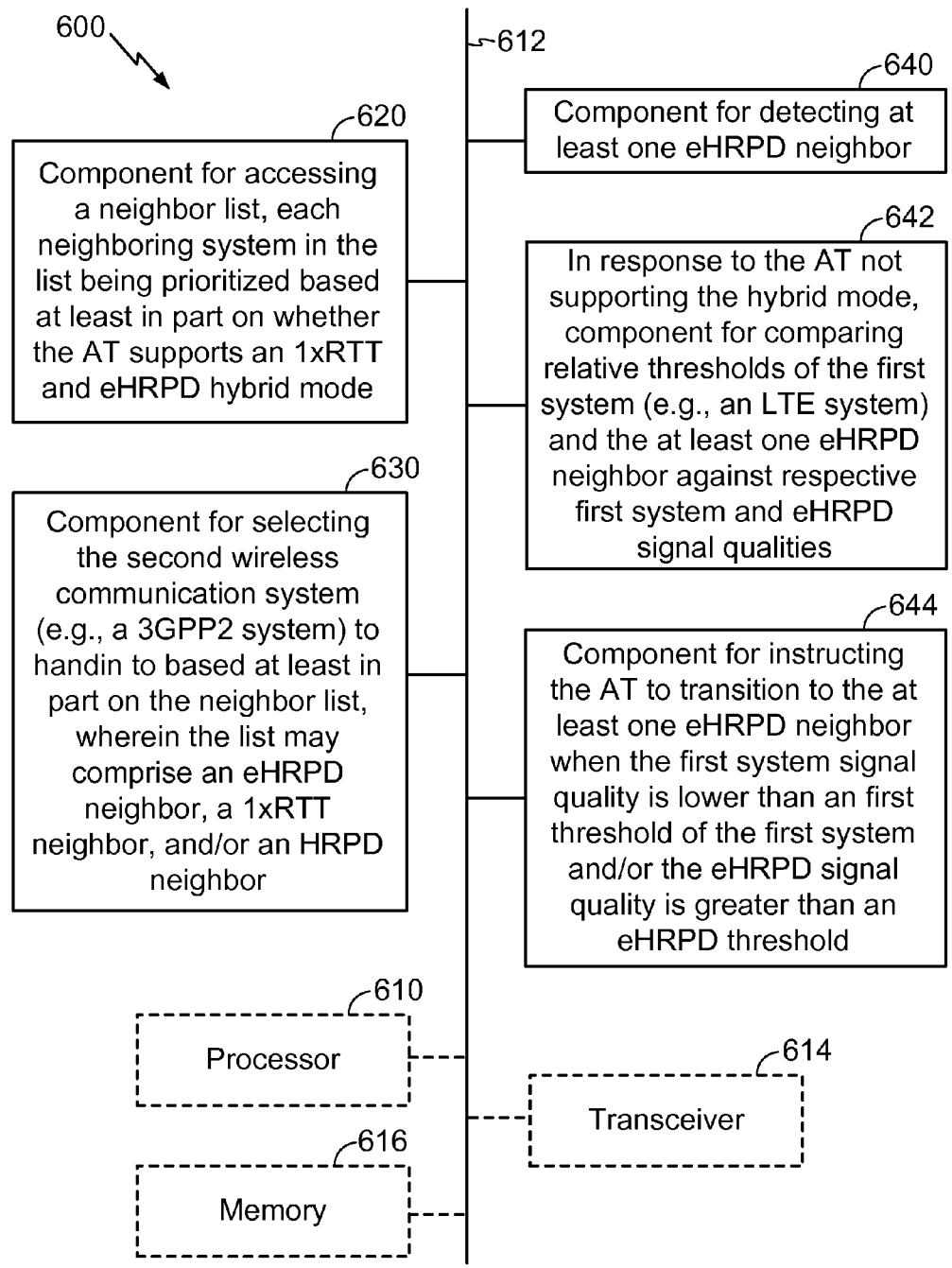
FIGS. 6A-C illustrate one embodiment of an apparatus for handling an idle transition.

In accordance with one or more aspects of the embodiments described herein, there are provided devices and apparatuses for handling an idle transition from a first wireless communication system to a second wireless communication system. With reference to FIG. 6A, there is provided an exemplary apparatus 600 that may be configured as either an AT or as a processor or similar device for use within the AT or similar communication device. As depicted, apparatus 600 may include functional blocks that can represent functions implemented by a processor, software, or combination thereof (e.g., firmware).

As illustrated, apparatus 600 may comprise an electrical component 620 for accessing a neighbor list, each neighboring system in the list being prioritized based at least in part on whether the AT supports an 1×RTT and eHRPD hybrid mode. Apparatus 600 may comprise an electrical component 630 for selecting the second wireless communication system (e.g., a 3GPP2 system) to handin to based at least in part on the neighbor list. For example, the list may comprise one or more eHRPD neighbors, one or more 1×RTT neighbors, and/or one or more HRPD neighbors.

Apparatus 600 may comprise an electrical component 640 for detecting at least one eHRPD neighbor. In response to the AT not supporting the hybrid mode, apparatus 600 may include an electrical component 642 for comparing relative thresholds of the first system (e.g., an LTE system) and the at least one eHRPD neighbor against respective first system and eHRPD signal qualities. Apparatus 600 may further include an electrical component 644 for instructing the AT to transition to the at least one eHRPD neighbor when the first system signal quality is lower than an first threshold of the first system and/or the eHRPD signal quality is greater than an eHRPD threshold.

Figure 6B:
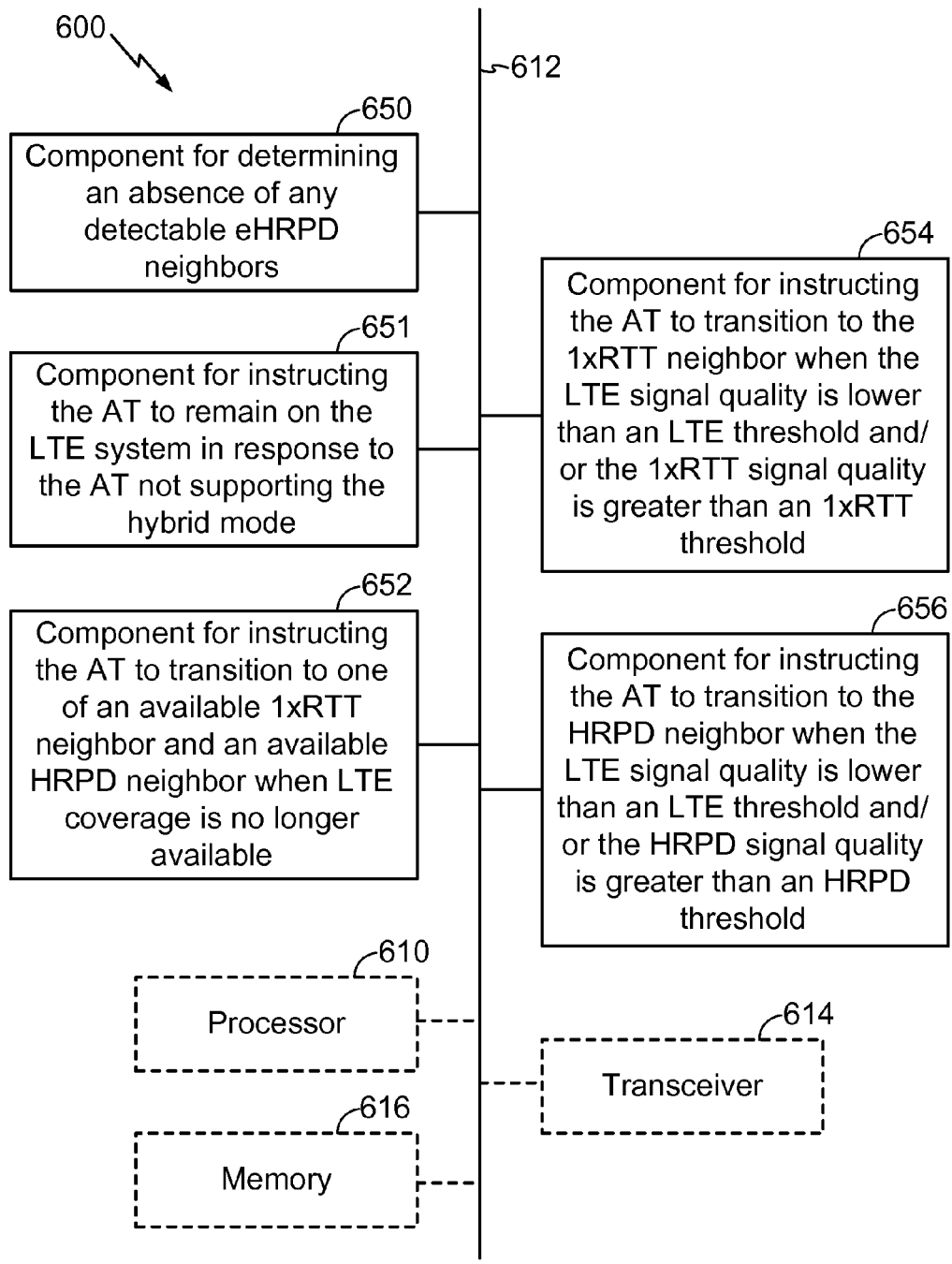

With reference to FIG. 6B, apparatus 600 may comprise an electrical component 650 for determining an absence of any detectable eHRPD neighbors, and an electrical component 651 for instructing the AT to remain on the LTE system in response to the AT not supporting the hybrid mode.

Apparatus 600 may further comprise an electrical component 652 for instructing the AT to transition to one of an available 1×RTT neighbor and an available HRPD neighbor when LTE coverage is no longer available. Apparatus 600 may further comprise an electrical component 654 for instructing the AT to transition to the 1×RTT neighbor when the LTE signal quality is lower than an LTE threshold and/or the 1×RTT signal quality is greater than an 1×RTT threshold. Apparatus 600 may further comprise an electrical component 656 for instructing the AT to transition to the HRPD neighbor when the LTE signal quality is lower than an LTE threshold and/or the HRPD signal quality is greater than an HRPD threshold.

Figure 6C:
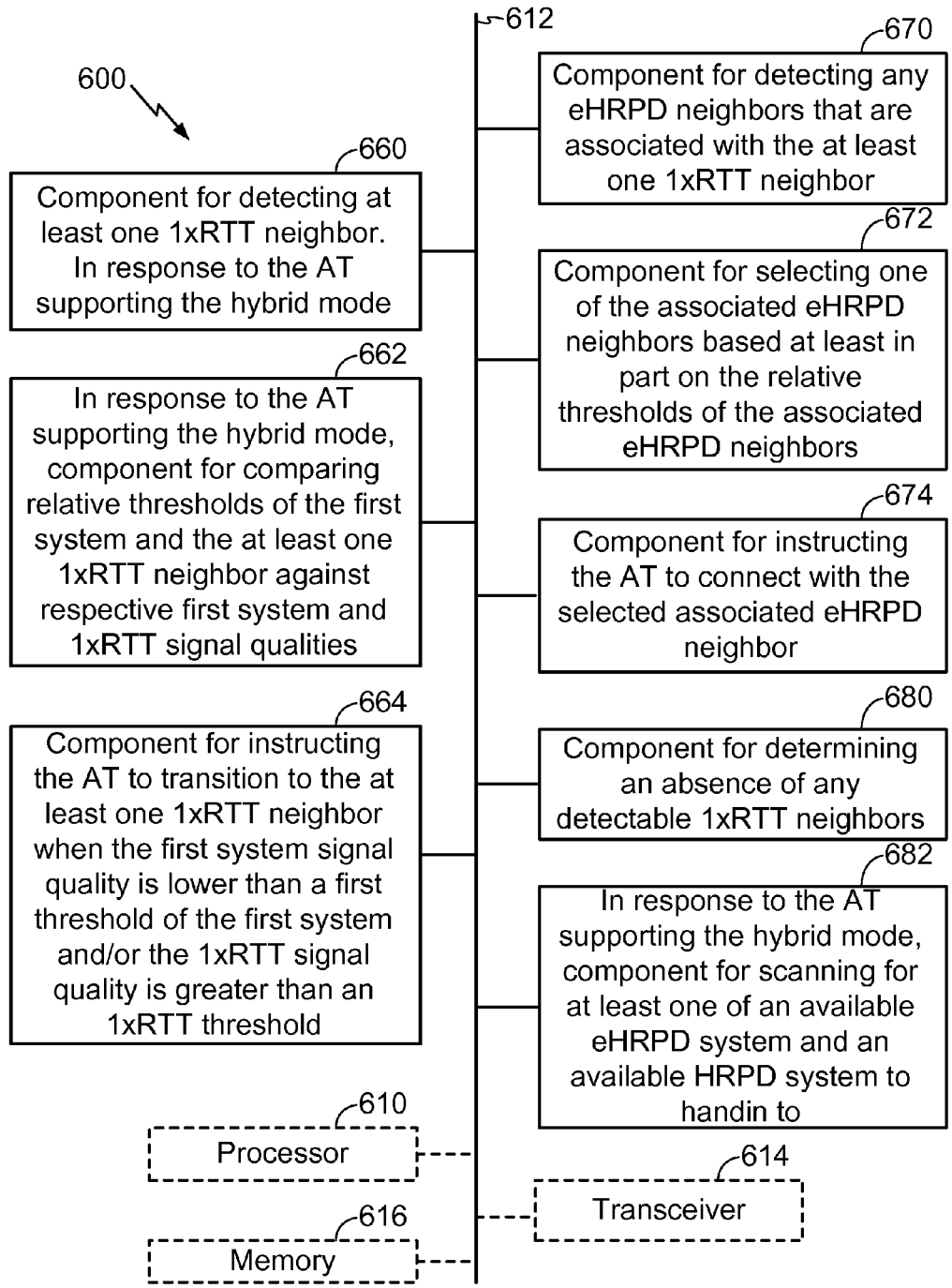

With reference to FIG. 6C, apparatus 600 may comprise an electrical component 660 for detecting at least one 1×RTT neighbor. In response to the AT supporting the hybrid mode, apparatus 600 may include an electrical component 662 for comparing relative thresholds of the first system and the at least one 1×RTT neighbor against respective first system and 1×RTT signal qualities. Apparatus 600 may further include an electrical component 664 for instructing the AT to transition to the at least one 1×RTT neighbor when the first system signal quality is lower than a first threshold of the first system and/or the 1×RTT signal quality is greater than an 1×RTT threshold.

Apparatus 600 may comprise an electrical component 670 for detecting any eHRPD neighbors that are associated with the at least one 1×RTT neighbor, an electrical component 672 for selecting one of the associated eHRPD neighbors based at least in part on the relative thresholds of the associated eHRPD neighbors, and an electrical component 674 for instructing the AT to connect with the selected associated eHRPD neighbor.

Apparatus 600 may further comprise an electrical component 680 for determining an absence of any detectable 1×RTT neighbors. In response to the AT supporting the hybrid mode, apparatus 600 may further include an electrical component 682 for scanning for at least one of an available eHRPD system and an available HRPD system to handin to.

It is noted that apparatus 600 may optionally include a processor module 610 having at least one processor, in the case of apparatus 600 configured as a communication network entity, rather than as a processor. Processor 610, in such case, may be in operative communication with electrical components 620-682 via a bus 612 or similar communication coupling. Processor 610 may effect initiation and scheduling of the processes or functions performed by electrical components 620-682.

In related aspects, apparatus 600 may include a transceiver module 614. A stand alone receiver and/or stand alone transmitter may be used in lieu of or in conjunction with transceiver 614. In further related aspects, apparatus 600 may optionally include a module for storing information, such as, for example, a memory device/module 616. Computer readable medium or memory device/module 616 may be operatively coupled to the other components of apparatus 600 via bus 612 or the like. The computer readable medium or memory device 616 may be adapted to store computer readable instructions and data for effecting the processes and behavior of electrical components 620-682, and subcomponents thereof, or processor 610, or the methods disclosed herein. Memory module 616 may retain instructions for executing functions associated with electrical components 620-682. While shown as being external to memory 616, it is to be understood that electrical components 620-682 can exist within memory 616.

Figure 7A:
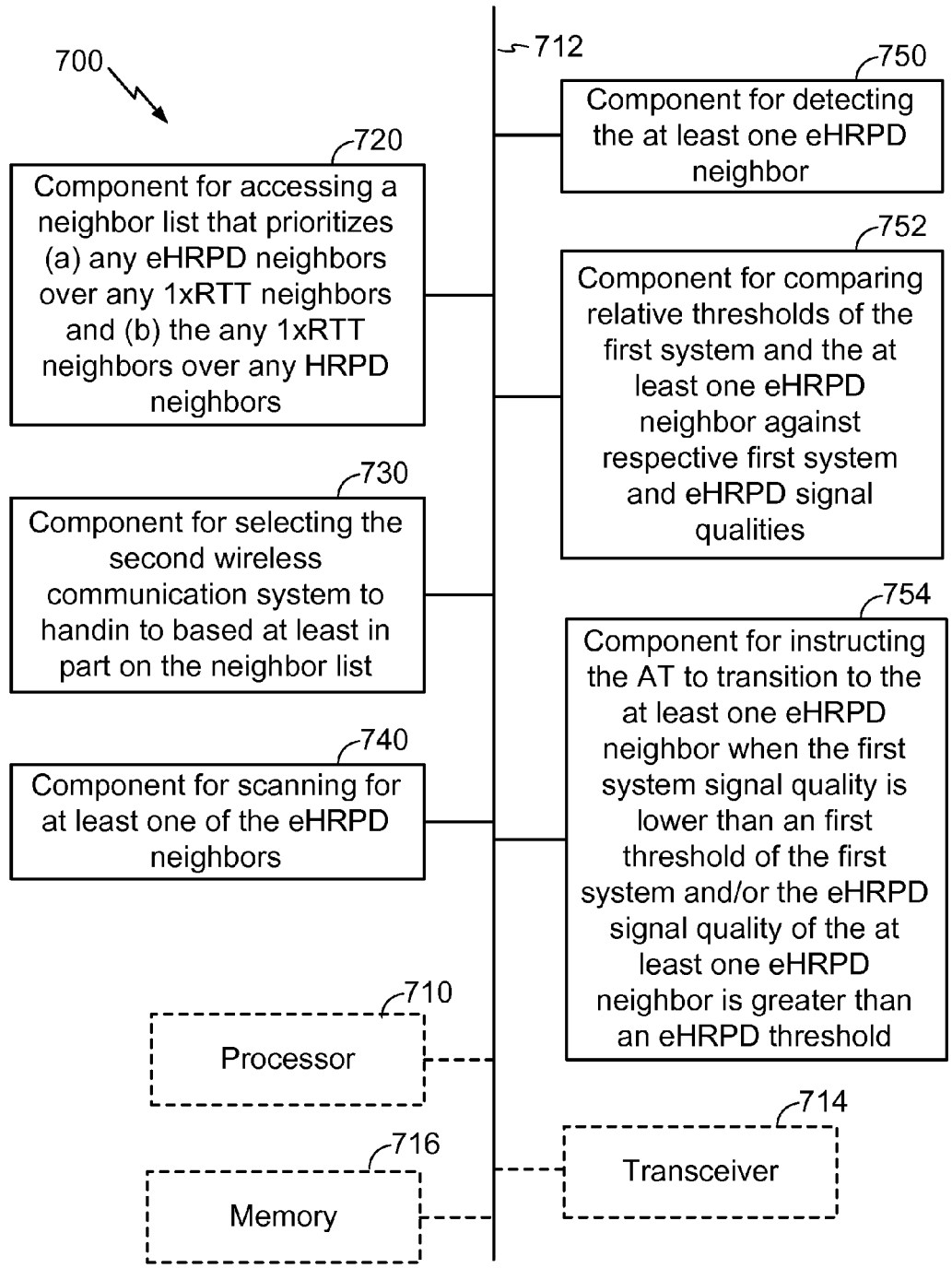
FIGS. 7A-B illustrate one embodiment of an apparatus for handling an in-traffic transition.

In accordance with one or more aspects of the embodiments described herein, there are provided devices and apparatuses for handling an in-traffic transition from a first wireless communication system to a second wireless communication system. With reference to FIG. 7A, there is provided an exemplary apparatus 700 that may be configured as either an AT or as a processor or similar device for use within the AT or similar communication device. As depicted, apparatus 700 may include functional blocks that can represent functions implemented by a processor, software, or combination thereof (e.g., firmware).

As illustrated, apparatus 700 may comprise an electrical component 720 for accessing a neighbor list that prioritizes (a) any eHRPD neighbors over any 1×RTT neighbors and (b) the any 1×RTT neighbors over any HRPD neighbors, and an electrical component 730 for selecting the second wireless communication system to handin to based at least in part on the neighbor list.

Apparatus 700 may comprise an electrical component 740 for scanning for at least one of the eHRPD neighbors. Apparatus 700 may comprise an electrical component 750 for detecting the at least one eHRPD neighbor, an electrical component 752 for comparing relative thresholds of the first system and the at least one eHRPD neighbor against respective first system and eHRPD signal qualities, and an electrical component 754 for instructing the AT to transition to the at least one eHRPD neighbor when the first system signal quality is lower than an first threshold of the first system and/or the eHRPD signal quality of the at least one eHRPD neighbor is greater than an eHRPD threshold.

Figure 7B:
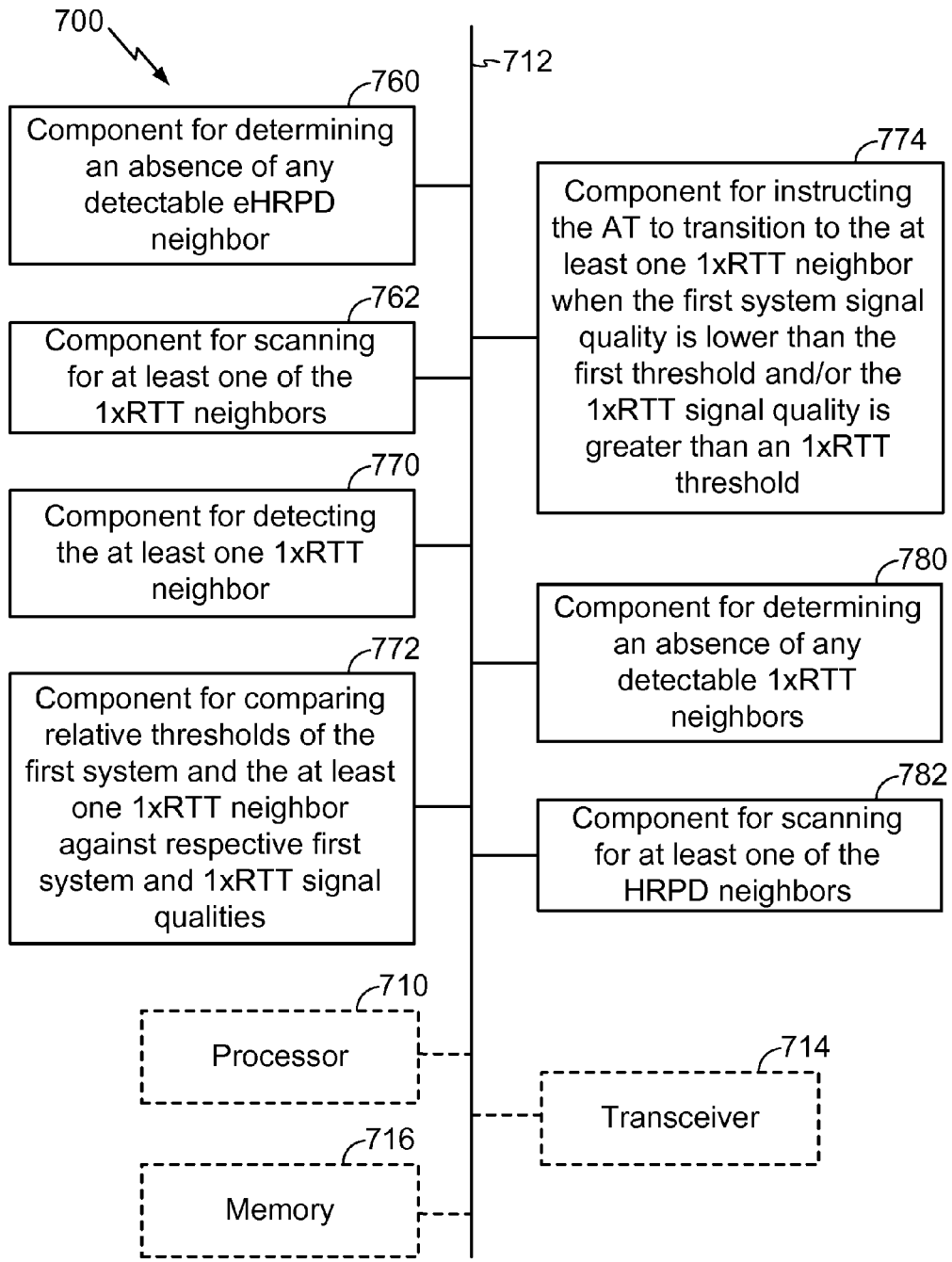

With reference to FIG. 7B, apparatus 700 may comprise an electrical component 760 for determining an absence of any detectable eHRPD neighbors, and an electrical component 762 for scanning for at least one of the 1×RTT neighbors. Apparatus 700 may comprise an electrical component 770 for detecting the at least one 1×RTT neighbor, an electrical component 772 for comparing relative thresholds of the first system and the at least one 1×RTT neighbor against respective first system and 1×RTT signal qualities, and an electrical component 774 for instructing the AT to transition to the at least one 1×RTT neighbor when the first system signal quality is lower than the first threshold and/or the 1×RTT signal quality is greater than an 1×RTT threshold. Apparatus 700 may comprise an electrical component 780 for determining an absence of any detectable 1×RTT neighbors, and an electrical component 782 for scanning for at least one of the HRPD neighbors.

It is noted that apparatus 700 may optionally include a processor module 710 having at least one processor, in the case of apparatus 700 configured as a communication network entity, rather than as a processor. Processor 710, in such case, may be in operative communication with electrical components 720-782 via a bus 712 or similar communication coupling. Processor 710 may effect initiation and scheduling of the processes or functions performed by electrical components 720-782.

In related aspects, apparatus 700 may include a transceiver module 714 for communicating with other communication network entities. A stand alone receiver and/or stand alone transmitter may be used in lieu of or in conjunction with transceiver 714. In further related aspects, apparatus 700 may optionally include a module for storing information, such as, for example, a memory device/module 716. Computer readable medium or memory device/module 716 may be operatively coupled to the other components of apparatus 700 via bus 712 or the like. The computer readable medium or memory device 716 may be adapted to store computer readable instructions and data for effecting the processes and behavior of electrical components 720-782, and subcomponents thereof, or processor 710, or the methods disclosed herein. Memory module 716 may retain instructions for executing functions associated with electrical components 720-782. While shown as being external to memory 716, it is to be understood that electrical components 720-782 can exist within memory 716.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in Random Access Memory (RAM), flash memory, Read-Only Memory (ROM), EPROM, Electrically Erasable Programmable Read-Only Memory (EEPROM), registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes Compact Disc (CD), laser disc, optical disc, Digital Versatile Disc (DVD), floppy disk and Blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method by which an access terminal handles an idle transition from a first wireless communication system to a second wireless communication system, comprising:
    accessing a neighbor list, each neighboring system in the neighbor list being prioritized in a preferred order based at least in part on whether the access terminal supports a hybrid mode in which the access terminal is configured to operate simultaneously in Single Carrier Radio Transmission Technology (1xRTT) and Evolved High Rate Packet Data (eHRPD) modes, wherein the preferred order of the neighbor list prioritizes, based on types of technology of each neighboring system in the neighbor list, 1xRTT neighbors over eHRPD neighbors and eHRPD neighbors over High Rate Packet Data (HRPD) neighbors; and
    selecting the second wireless communication system to handoff to based at least in part on the neighbor list;
    wherein selecting the second wireless communication system includes:
    detecting at least one 1xRTT neighbor;
    in response to the access terminal supporting the hybrid mode, comparing relative thresholds of the first wireless communication system and the at least one 1xRTT neighbor against a respective one of a first wireless communication system signal quality and a 1xRTT signal quality;
    transitioning to the at least one 1xRTT neighbor when the first wireless communication system signal quality is lower than a first threshold and/or the 1xRTT signal quality is greater than an 1xRTT threshold;
    detecting any eHRPD neighbors that are associated with the at least one 1xRTT neighbor;
    selecting one of the associated eHRPD neighbors based at least in part on relative thresholds of the associated eHRPD neighbors; and
    connecting with the selected one of the associated eHRPD neighbors.

2. The method of claim 1, wherein the neighbor list comprises at least one of an eHRPD neighbor, a 1xRTT neighbor, and a High Rate Packet Data (HRPD) neighbor.

3. The method of claim 1, wherein selecting the second wireless communication system comprises:
    detecting at least one eHRPD neighbor;
    in response to the access terminal not supporting the hybrid mode, comparing relative thresholds of the first wireless communication system and the at least one eHRPD neighbor against a respective one of a first wireless communication system signal quality and an eHRPD signal quality; and
    transitioning to the at least one eHRPD neighbor when the first wireless communication system signal quality is lower than a first threshold of the first wireless communication system and/or the eHRPD signal quality is greater than an eHRPD threshold.

4. The method of claim 1, wherein the first wireless communication system comprises a Long Term Evolution (LTE) system and the second wireless communication system comprises a 3rd Generation Partnership Project 2 (3GPP2) system.

5. The method of claim 4, wherein selecting the second wireless communication system further comprises:
    determining an absence of any detectable eHRPD neighbors; and
    in response to the access terminal not supporting the hybrid mode, remaining on the first wireless communication system.

6. The method of claim 5, wherein selecting the second wireless communication system further comprises transitioning to one of an available 1xRTT neighbor and an available HRPD neighbor when LTE coverage is no longer available.

7. The method of claim 6, wherein selecting the second wireless communication system further comprises transitioning to the 1xRTT neighbor when an LTE signal quality is lower than an LTE threshold and/or an 1xRTT signal quality is greater than an 1xRTT threshold.

8. The method of claim 6, wherein selecting the second wireless communication system further comprises transitioning to the HRPD neighbor when an LTE signal quality is lower than an LTE threshold and/or an HRPD signal quality is greater than an HRPD threshold.

9. The method of claim 1, wherein selecting the second wireless communication system further comprises:
    determining an absence of any detectable 1xRTT neighbors; and in response to the access terminal supporting the hybrid mode, scanning for at least one of an available eHRPD system and an available HRPD system to handoff to.

10. A method by which an access terminal handles an in-traffic transition from a first wireless communication system to a second wireless communication system, comprising:
accessing a neighbor list that includes a preferred order of neighboring systems that prioritizes, based on types of technology of the neighboring systems, any Evolved High Rate Packet Data (eHRPD) neighbors over any Single Carrier Radio Transmission Technology (1×RTT) neighbors and the any 1×RTT neighbors over any High Rate Packet Data (HRPD) neighbors; and
selecting the second wireless communication system to handoff to based at least in part on the neighbor list;
wherein selecting the second wireless communication system includes:
determining an absence of any detectable eHRPD neighbors;
scanning for at least one 1×RTT neighbor;
detecting the at least one 1×RTT neighbor;
comparing relative thresholds of the first wireless communication system and the at least one 1×RTT neighbor against a respective one of a first wireless communication system signal quality and an 1×RTT signal quality; and
transitioning to the at least one 1×RTT neighbor when the first wireless communication system signal quality is lower than the first threshold and/or the 1×RTT signal quality is greater than an 1×RTT threshold.

11. The method of claim 10, wherein selecting the second wireless communication system comprises scanning for at least one eHRPD neighbor.

12. The method of claim 11,
wherein selecting the second wireless communication system further comprises:
detecting the at least one eHRPD neighbor;
comparing relative thresholds of the first wireless communication system and the at least one eHRPD neighbor against a respective one of a first wireless communication system signal quality and an eHRPD signal quality; and
transitioning to the at least one eHRPD neighbor when the first wireless communication system signal quality is lower than a first threshold of the first wireless communication system and/or the eHRPD signal quality is greater than an eHRPD threshold.

13. The method of claim 10, wherein selecting the second wireless communication system further comprises:
determining an absence of any detectable 1×RTT neighbors; and
scanning for at least one HRPD neighbor.

14. A communication device for handling an idle transition of an access terminal from a first wireless communication system to a second wireless communication system, comprising:
a transceiver module;
at least one processor operatively coupled with the transceiver module; and
a memory module operatively coupled with the at least one processor and comprising executable code for the at least one processor to:
access a neighbor list, each neighboring system in the neighbor list being prioritized in a preferred order based at least in part on whether the access terminal supports a hybrid mode in which the access terminal is configured to operate simultaneously in Single Carrier Radio Transmission Technology (1×RTT) and Evolved High Rate Packet Data (eHRPD) modes, wherein the preferred order of the neighbor list prioritizes, based on types of technology of each neighboring system in the neighbor list, 1×RTT neighbors over eHRPD neighbors and eHRPD neighbors over High Rate Packet Data (HRPD) neighbors; and
select the second wireless communication system to handoff to based at least in part on the neighbor list;
wherein the code for the at least one processor to select the second wireless communication system includes code for the at least one processor to:
detect at least one 1×RTT neighbor;
in response to the access terminal supporting the hybrid mode, compare relative thresholds of the first wireless communication system and the at least one 1×RTT neighbor against a respective one of a first wireless communication system signal quality and 1×RTT signal quality;
instruct the access terminal to transition to the at least one 1×RTT neighbor when the first wireless communication system signal quality is lower than a first threshold of the first wireless communication system and/or the 1×RTT signal quality is greater than an 1×RTT threshold;
detect any eHRPD neighbors that are associated with the at least one 1×RTT neighbor;
select one of the associated eHRPD neighbors based at least in part on relative thresholds of the associated eHRPD neighbors; and
instruct the access terminal to connect with the selected one of the associated eHRPD neighbors.

15. The communication device of claim 14, wherein the at least one processor:
detects at least one eHRPD neighbor;
in response to the access terminal not supporting the hybrid mode, compares relative thresholds of the first wireless communication system and the at least one eHRPD neighbor against a respective one of a first wireless communication system signal quality and an eHRPD signal quality; and
instructs the access terminal to transition to the at least one eHRPD neighbor when the first wireless communication system signal quality is lower than an first threshold of the first wireless communication system and/or the eHRPD signal quality is greater than an eHRPD threshold.

16. The communication device of claim 14, wherein the first wireless communication system comprises a Long Term Evolution (LTE) system and the second wireless communication system comprises a 3rd Generation Partnership Project 2 (3GPP2) system.

17. The communication device of claim 16, wherein the at least one processor:
determines an absence of any detectable eHRPD neighbors; and
in response to the access terminal not supporting the hybrid mode, instructs the access terminal to remain on the first wireless communication system.

18. The communication device of claim 17, wherein the at least one processor instructs the access terminal to transition to one of an available 1×RTT neighbor and an available High Rate Packet Data (HRPD) neighbor when LTE coverage is no longer available.

19. The communication device of claim 18, wherein the at least one processor instructs the access terminal to transition to the 1×RTT neighbor when an LTE signal quality is lower than an LTE threshold and/or an 1×RTT signal quality is greater than an 1×RTT threshold.

20. The communication device of claim 18, wherein the at least one processor instructs the access terminal to transition to the HRPD neighbor when an LTE signal quality is lower than an LTE threshold and/or an HRPD signal quality is greater than an HRPD threshold.

21. The communication device of claim 14, wherein the at least one processor:
   determines an absence of any detectable 1×RTT neighbors; and
   in response to the access terminal supporting the hybrid mode, scans for at least one of an available eHRPD system and an available HRPD system to handoff to.

22. A communication device for handling an in-traffic transition of an access terminal from a first wireless communication system to a second wireless communication system, comprising:
   a transceiver module;
   at least one processor operatively coupled with the transceiver module; and
   a memory module operatively coupled with the at least one processor and comprising executable code for the at least one processor to:
   access a neighbor list that includes a preferred order of neighboring systems that prioritizes, based on types of technology of the neighboring systems, any Evolved High Rate Packet Data (eHRPD) neighbors over any Single Carrier Radio Transmission Technology (1×RTT) neighbors and the any 1×RTT neighbors over any High Rate Packet Data (HRPD) neighbors; and
   select the second wireless communication system to handoff to based at least in part on the neighbor list;
   wherein the executable code for the at least one processor to select the second wireless communication system includes code for the at least one processor to:
   determine an absence of any detectable eHRPD neighbors;
   scan for at least one 1×RTT neighbor;
   detect the at least one 1×RTT neighbor;
   compare relative thresholds of the first wireless communication system and the at least one 1×RTT neighbor against a respective one of a first wireless communication system signal quality and an 1×RTT signal quality; and
   instruct the access terminal to transition to the at least one 1×RTT neighbor when the first wireless communication system signal quality is lower than the first threshold and/or the 1×RTT signal quality is greater than an 1×RTT threshold.

23. The communication device of claim 22, wherein the executable code further comprises code for the at least one processor to scan for at least one eHRPD neighbor.

24. The communication device of claim 23, wherein the executable code further comprises code for the at least one processor to:
   detect the at least one eHRPD neighbor;
   compare relative thresholds of the first wireless communication system and the at least one eHRPD neighbor against a respective one of a first wireless communication system signal quality and an eHRPD signal quality; and
   instruct an access terminal to transition to the at least one eHRPD neighbor when the first wireless communication system signal quality is lower than a first threshold of the first wireless communication system and/or the eHRPD signal quality is greater than an eHRPD threshold.

25. The communication device of claim 22, wherein the executable code further comprises code for the at least one processor to:
   determine an absence of any detectable 1×RTT neighbors; and
   scan for at least one HRPD neighbor.

26. An apparatus for handling an idle transition of an access terminal from a first wireless communication system to a second wireless communication system, comprising:
   a first component configured to access a neighbor list of the access terminal, each neighboring system in the neighbor list being prioritized in a preferred order based at least in part on whether the access terminal supports a hybrid mode in which the access terminal is configured to operate simultaneously in Single Carrier Radio Transmission Technology (1×RTT) and Evolved High Rate Packet Data (eHRPD) modes, wherein the preferred order of the neighbor list prioritizes, based on types of technology of each neighboring system in the neighbor list, 1×RTT neighbors prioritized over eHRPD neighbors and eHRPD neighbors over High Rate Packet Data (HRPD) neighbors; and
   a second component configured to select the second wireless communication system to handoff to based at least in part on the neighbor list;
   wherein the second component configured to select the second wireless communication system includes:
   a third component configured to:
   detect at least one 1×RTT neighbor;
   in response to the access terminal supporting the hybrid mode, compare relative thresholds of the first wireless communication system and the at least one 1×RTT neighbor against a respective one of a first wireless communication system signal quality and an 1×RTT signal quality; and
   instruct the access terminal to transition to the at least one 1×RTT neighbor when the first wireless communication system signal quality is lower than a first threshold and/or the 1×RTT signal quality is greater than an 1×RTT threshold; and
   a fourth component configured to:
   detect any eHRPD neighbors that are associated with the at least one 1×RTT neighbor;
   select one of the associated eHRPD neighbors based at least in part on relative thresholds of the associated eHRPD neighbors; and
   instruct the access terminal to connect with the selected one of the associated eHRPD neighbors.

27. The apparatus of claim 26, wherein the second component is further configured to:
   detect at least one eHRPD neighbor;
   in response to the access terminal not supporting the hybrid mode, compare relative thresholds of the first wireless communication system and the at least one eHRPD neighbor against a respective one of a first wireless communication system signal quality and an eHRPD signal quality; and
   instruct the access terminal to transition to the at least one eHRPD neighbor when the first wireless communication system signal quality is lower than a first threshold of the first wireless communication system and/or the eHRPD signal quality is greater than an eHRPD threshold.

28. The apparatus of claim 26, wherein the first wireless communication system comprises a Long Term Evolution (LTE) system and the second wireless communication system comprises a 3rd Generation Partnership Project 2 (3GPP2) system.

29. The apparatus of claim 28, further comprising a fifth component configured to:
    determine an absence of any detectable eHRPD neighbors; and
    in response to the access terminal not supporting the hybrid mode, instruct the access terminal to remain on the first wireless communication system.

30. The apparatus of claim 29, further comprising a sixth component for instructing the access terminal to transition to one of an available 1×RTT neighbor and an available High Rate Packet Data (HRPD) neighbor when LTE coverage is no longer available.

31. The apparatus of claim 30, further comprising a seventh component for instructing the access terminal to transition to the 1×RTT neighbor when an LTE signal quality is lower than an LTE threshold and/or an 1×RTT signal quality is greater than an 1×RTT threshold.

32. The apparatus of claim 30, further comprising a eighth component for instructing the access terminal to transition to the HRPD neighbor when an LTE signal quality is lower than an LTE threshold and/or an HRPD signal quality is greater than an HRPD threshold.

33. The apparatus of claim 26, wherein the first wireless communication system comprises an LTE system and the second wireless communication system comprises a 3GPP2 system.

34. The apparatus of claim 26, further comprising a fifth component configured to:
    determine an absence of any detectable 1×RTT neighbors; and
    in response to the access terminal supporting the hybrid mode, scan for at least one of an available eHRPD system and an available HRPD system to handoff to.

35. An apparatus for handling an in-traffic transition of an access terminal from a first wireless communication system to a second wireless communication system, comprising:
    a first component for accessing a neighbor list that includes a preferred order of neighboring systems that prioritizes, based on types of technology of the neighboring systems, any Evolved High Rate Packet Data (eHRPD) neighbors over any Single Carrier Radio Transmission Technology (1×RTT) neighbors and the any 1×RTT neighbors over any High Rate Packet Data (HRPD) neighbors; and
    a second component for selecting the second wireless communication system to handoff to based at least in part on the neighbor list;
    wherein the second component for selecting the second wireless communication system includes:
    a third component for determining an absence of any detectable eHRPD neighbors;
    a fourth component for scanning for at least one 1×RTT neighbor;
    a fifth component for detecting the at least one 1×RTT neighbor;
    a sixth component for comparing relative thresholds of the first wireless communication system and the at least one 1×RTT neighbor against a respective one of a first wireless communication system signal quality and an 1×RTT signal quality; and
    a seventh component for instructing the access terminal to transition to the at least one 1×RTT neighbor when the first wireless communication system signal quality is lower than the first threshold and/or the 1×RTT signal quality is greater than an 1×RTT threshold.

36. The apparatus of claim 35, wherein the second component is configured to scan for at least one eHRPD neighbor.

37. An apparatus for handling an idle transition of an access terminal from a first wireless communication system to a second wireless communication system, comprising:
    means for accessing a neighbor list, each neighboring system in the neighbor list being prioritized in a preferred order based at least in part on whether the access terminal supports a hybrid mode in which the access terminal is configured to operate simultaneously in Single Carrier Radio Transmission Technology (1×RTT) and Evolved High Rate Packet Data (eHRPD) modes, wherein the preferred order of the neighbor list prioritizes, based on types of technology of each neighboring system in the neighbor list, 1×RTT neighbors over eHRPD neighbors and eHRPD neighbors over High Rate Packet Data (HRPD) neighbors; and
    means for selecting the second wireless communication system to handoff to based at least in part on the neighbor list;
    wherein the means for selecting the second wireless communication system includes:
    means for detecting at least one 1×RTT neighbor;
    in response to the access terminal supporting the hybrid mode, means for comparing relative thresholds of the first wireless communication system and the at least one 1×RTT neighbor against a respective one of a first wireless communication system and an 1×RTT signal quality;
    means for instructing the access terminal to transition to the at least one 1×RTT neighbor when the first wireless communication system signal quality is lower than a first threshold and/or the 1×RTT signal quality is greater than an 1×RTT threshold;
    means for detecting any eHRPD neighbors that are associated with the at least one 1×RTT neighbor;
    means for selecting one of the associated eHRPD neighbors based at least in part on relative thresholds of the associated eHRPD neighbors; and
    means for instructing the access terminal to connect with the selected one of the associated eHRPD neighbors.

38. The apparatus of claim 37, wherein the means for selecting the second wireless communication system further comprises:
    means for detecting at least one eHRPD neighbor;
    in response to the access terminal not supporting the hybrid mode, means for comparing relative thresholds of the first wireless communication system and the at least one eHRPD neighbor against a respective one of a first wireless communication system signal quality and an eHRPD signal quality; and
    means for instructing the access terminal to transition to the at least one eHRPD neighbor when the first wireless communication system signal quality is lower than a first threshold of the first wireless communication system and/or the eHRPD signal quality is greater than an eHRPD threshold.

39. The apparatus of claim 37, wherein the first wireless communication system comprises a Long Term Evolution (LTE) system and the second wireless communication system comprises a 3rd Generation Partnership Project (3GPP2) system.

40. The apparatus of claim 39, wherein the means for selecting the second wireless communication system further comprises:

means for determining an absence of any detectable eHRPD neighbors; and in response to the access terminal not supporting the hybrid mode, means for instructing the access terminal to remain on the first wireless communication system.

41. The apparatus of claim 40, wherein the means for selecting the second wireless communication system further comprises
means for instructing the access terminal to transition to one of an available 1×RTT neighbor and an available High Rate Packet Data (HRPD) neighbor when LTE coverage is no longer available.

42. The apparatus of claim 41, wherein the means for selecting the second wireless communication system comprises
means for instructing the access terminal to transition to the 1×RTT neighbor when an LTE signal quality is lower than an LTE threshold and/or an 1×RTT signal quality is greater than an 1×RTT threshold.

43. The apparatus of claim 41, wherein the means for selecting the second wireless communication system comprises
means for instructing the access terminal to transition to the HRPD neighbor when an LTE signal quality is lower than an LTE threshold and/or an HRPD signal quality is greater than an HRPD threshold.

44. The apparatus of claim 37, wherein the first wireless communication system comprises an LTE system and the second wireless communication system comprises a 3GPP2 system.

45. The apparatus of claim 44, wherein the means for selecting the second wireless communication system comprises:
means for determining an absence of any detectable 1×RTT neighbors; and
in response to the access terminal supporting the hybrid mode, means for scanning for at least one of an available eHRPD system and an available HRPD system to handoff to.

46. An apparatus for handling an in-traffic transition of an access terminal from a first wireless communication system to a second wireless communication system, comprising:
means for accessing a neighbor list that includes a preferred order of neighboring systems that prioritizes, based on types of technology of the neighboring systems, any Evolved High Rate Packet Data (eHRPD) neighbors over any Single Carrier Radio Transmission Technology (1×RTT) neighbors and the any 1×RTT neighbors over any High Rate Packet Data (HRPD) neighbors; and
means for selecting the second wireless communication system to handoff to based at least in part on the neighbor list;
wherein the means for selecting the second wireless communication system includes:
means for determining an absence of any detectable eHRPD neighbors;
means for scanning for at least one 1×RTT neighbor;
means for detecting the at least one 1×RTT neighbor;
means for comparing relative thresholds of the first wireless communication system and the at least one 1×RTT neighbor against a respective one of a first wireless communication system signal quality and an 1×RTT signal quality; and
means for instructing the access terminal to transition to the at least one 1×RTT neighbor when the first wireless communication system signal quality is lower than the first threshold and/or the 1×RTT signal quality is greater than an 1×RTT threshold.

47. The apparatus of claim 46, further comprising means for scanning for at least one eHRPD neighbor.

48. A non-transitory computer-readable medium storing computer executable code, comprising:
in response to an access terminal attempting a an idle transition from a first wireless communication system to a second wireless communication system, code for causing a processor of the access terminal to:
access a neighbor list for the access terminal, each neighboring system in the neighbor list being prioritized in a preferred order based at least in part on whether the access terminal supports a hybrid mode in which the access terminal is configured to operate simultaneously in Single Carrier Radio Transmission Technology (1×RTT) and Evolved High Rate Packet Data (eHRPD) modes, wherein the preferred order of the neighbor list prioritizes, based on types of technology of each neighboring system in the neighbor list, 1×RTT neighbors over eHRPD neighbors and eHRPD neighbors over High Rate Packet Data (HRPD) neighbors; and
select the second wireless communication system to handoff to based at least in part on the neighbor list;
wherein the code for causing the processor of the access terminal to select the second wireless communication system comprises code for causing the processor of the access terminal to:
detect at least one 1×RTT neighbor;
in response to the access terminal supporting the hybrid mode, compare relative thresholds of the first wireless communication system and the at least one 1×RTT neighbor against a respective one of a first wireless communication system and an 1×RTT signal quality;
instruct the access terminal to transition to the at least one 1×RTT neighbor when the first wireless communication system signal quality is lower than a first threshold and/or the 1×RTT signal quality is greater than an 1×RTT threshold;
detect any eHRPD neighbors that are associated with the at least one 1×RTT neighbor;
select one of the associated eHRPD neighbors based at least in part on relative thresholds of the associated eHRPD neighbors; and
instruct the access terminal to connect with the selected one of the associated eHRPD neighbors.

49. The non-transitory computer-readable medium of claim 48, further comprising code for causing the processor to:
detect at least one eHRPD neighbor;
in response to the access terminal not supporting the hybrid mode, compare relative thresholds of the first wireless communication system and the at least one eHRPD neighbor against a respective one of a first wireless communication system signal quality and an eHRPD signal quality; and
instruct the access terminal to transition to the at least one eHRPD neighbor when the first wireless communication system signal quality is lower than a first threshold of the first wireless communication system and/or the eHRPD signal quality is greater than an eHRPD threshold.

50. The non-transitory computer-readable medium computer program product of claim 48, wherein the first wireless communication system comprises a Long Term Evolution (LTE) system and the second wireless communication system comprises a 3rd Generation Partnership Project 2 (3GPP2) system.

51. A non-transitory computer-readable medium storing computer executable code, comprising:
in response to an in-traffic transition of an access terminal from a first wireless communication system to a second wireless communication system, code for causing a processor of the access terminal to access a neighbor list that includes a preferred order of neighboring systems that prioritizes, based on types of technology of the neighboring systems, any Evolved High Rate Packet Data (eHRPD) neighbors over any Single Carrier Radio Transmission Technology (1×RTT) neighbors and the any 1×RTT neighbors over any High Rate Packet Data (HRPD) neighbors; and
code for causing the processor to select the second wireless communication system to handoff to based at least in part on the neighbor list;
wherein the code for causing the processor to select the second wireless communication system includes:
code for causing the processor to determine an absence of any detectable eHRPD neighbors;
code for causing the processor to scan for at least one 1×RTT neighbor;
code for causing the processor to detect the at least one 1×RTT neighbor;
code for causing the processor to compare relative thresholds of the first wireless communication system and the at least one 1×RTT neighbor against a respective one of a first wireless communication system signal quality and an 1×RTT signal quality; and
code for causing the processor to instruct the access terminal to transition to the at least one 1×RTT neighbor when the first wireless communication system signal quality is lower than the first threshold and/or the 1×RTT signal quality is greater than an 1×RTT threshold.

52. The non-transitory computer-readable medium of claim 51, further comprising code for causing the processor to scan for at least one eHRPD neighbor.

* * * * *